(12) United States Patent
Sinha et al.

(10) Patent No.: US 11,280,509 B2
(45) Date of Patent: Mar. 22, 2022

(54) SYSTEMS AND METHODS FOR AGENT BASED BUILDING SIMULATION FOR OPTIMAL CONTROL

(71) Applicant: Johnson Controls Technology Company, Auburn Hills, MI (US)

(72) Inventors: Sudhi R. Sinha, Milwaukee, WI (US); Youngchoon Park, Brookfield, WI (US); Kelsey Carle Schuster, Wauwatosa, WI (US); Vaidhyanathan Venkiteswaran, Brookfield, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 808 days.

(21) Appl. No.: 16/036,685

(22) Filed: Jul. 16, 2018

(65) Prior Publication Data

US 2019/0017719 A1    Jan. 17, 2019

Related U.S. Application Data

(60) Provisional application No. 62/533,581, filed on Jul. 17, 2017.

(51) Int. Cl.
*G06F 15/177* (2006.01)
*F24F 11/46* (2018.01)
(Continued)

(52) U.S. Cl.
CPC .............. *F24F 11/46* (2018.01); *F24F 11/52* (2018.01); *F24F 11/54* (2018.01); *F24F 11/56* (2018.01);
(Continued)

(58) Field of Classification Search
CPC .. F24F 11/46; F24F 11/65; F24F 11/56; F24F 11/52; F24F 11/54; H04L 67/2809; H04L 12/2803; G05B 13/042
See application file for complete search history.

(56) References Cited

U.S. PATENT DOCUMENTS 5,301,109 A    4/1994  Landauer et al.
5,812,962 A    9/1998  Kovac
(Continued)

FOREIGN PATENT DOCUMENTS

CN    106204392 A    12/2016
CN    106406806 A     2/2017
(Continued)

OTHER PUBLICATIONS

Priyadarshana, et al.; Multi-agent controlled building management system; Apr. 21, 2017, IEEE; 5 pages (Year: 2017).*
(Continued)

*Primary Examiner* — Oleg Survillo
(74) *Attorney, Agent, or Firm* — Foley & Lardner LLP

(57) ABSTRACT

A system for a building management system simulation includes one or more processors and memory. The memory includes instructions stored thereon, that when executed by the one or more processors, cause the one or more processors to generate a space agent representing a space in a building, the space agent to maintain an environmental condition of the space based on an optimization state of the space, generate an equipment agent representing a device that serves the space, and register the space agent and the equipment agent to a space communication channel associated with the space. The space agent communicates with the equipment agent over the space communication channel.

20 Claims, 14 Drawing Sheets

(51) Int. Cl.
  *G05B 13/04* (2006.01)
  *H04L 67/562* (2022.01)
  *F24F 11/54* (2018.01)
  *F24F 11/56* (2018.01)
  *F24F 11/65* (2018.01)
  *F24F 11/52* (2018.01)
  *G05B 15/02* (2006.01)

(52) U.S. Cl.
  CPC ............ *F24F 11/65* (2018.01); *G05B 13/042* (2013.01); *G05B 15/02* (2013.01); *H04L 67/2809* (2013.01); *G05B 2219/2642* (2013.01)

(56) References Cited

U.S. PATENT DOCUMENTS

| | | | |
|---|---|---|---|
| 6,240,326 | B1 | 5/2001 | Gloudeman et al. |
| 6,434,530 | B1 | 8/2002 | Sloane et al. |
| 6,487,457 | B1 | 11/2002 | Hull et al. |
| 6,493,755 | B1 | 12/2002 | Hansen et al. |
| 6,556,983 | B1 | 4/2003 | Altschuler et al. |
| 6,816,811 | B2 | 11/2004 | Seem |
| 6,986,138 | B1 | 1/2006 | Sakaguchi et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,917,570 | B2 * | 3/2011 | Ishii ............... H04W 40/246 709/200 |
| 7,996,488 | B1 | 8/2011 | Casabella et al. |
| 8,078,330 | B2 | 12/2011 | Brickfield et al. |
| 8,229,470 | B1 | 7/2012 | Ranjan et al. |
| 8,285,744 | B2 | 10/2012 | Dorgelo et al. |
| 8,401,991 | B2 | 3/2013 | Wu et al. |
| 8,495,745 | B1 | 7/2013 | Schrecker et al. |
| 8,503,330 | B1 * | 8/2013 | Choong ............. H04W 24/02 370/254 |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,800,648 | B2 * | 10/2017 | Agarwal ............. H04L 67/42 |
| 9,811,249 | B2 | 11/2017 | Chen et al. |
| 9,817,383 | B1 | 11/2017 | Sinha et al. |
| 9,886,478 | B2 | 2/2018 | Mukherjee |
| 9,948,359 | B2 | 4/2018 | Horton |
| 10,055,206 | B2 | 8/2018 | Park et al. |
| 10,095,756 | B2 | 10/2018 | Park et al. |
| 10,116,461 | B2 | 10/2018 | Fairweather et al. |
| 10,169,454 | B2 | 1/2019 | Ait-Mokhtar et al. |
| 10,169,486 | B2 | 1/2019 | Park et al. |
| 10,171,586 | B2 | 1/2019 | Shaashua et al. |
| 10,187,258 | B2 | 1/2019 | Nagesh et al. |
| 10,225,216 | B2 | 3/2019 | Wise et al. |
| 10,389,742 | B2 | 8/2019 | Devi Reddy et al. |
| 10,417,245 | B2 | 9/2019 | Park et al. |
| 10,417,451 | B2 | 9/2019 | Park et al. |
| 10,536,295 | B2 | 1/2020 | Fairweather et al. |
| 10,565,844 | B2 | 2/2020 | Pourmohammad et al. |
| 10,573,168 | B1 | 2/2020 | Razak et al. |
| 10,600,263 | B2 | 3/2020 | Park et al. |
| 10,607,478 | B1 | 3/2020 | Stewart et al. |
| 10,630,706 | B2 | 4/2020 | Devi Reddy et al. |
| 10,684,033 | B2 | 6/2020 | Sinha et al. |
| 10,739,029 | B2 | 8/2020 | Sinha et al. |
| 10,747,183 | B2 | 8/2020 | Sinha et al. |
| 10,798,175 | B1 | 10/2020 | Knight et al. |
| 10,859,984 | B2 | 12/2020 | Park |
| 10,901,373 | B2 | 1/2021 | Locke et al. |
| 11,042,144 | B2 * | 6/2021 | Park ................... G05B 19/0421 |
| 2002/0016639 | A1 | 2/2002 | Smith et al. |
| 2003/0073432 | A1 | 4/2003 | Meade, II |
| 2003/0171851 | A1 * | 9/2003 | Brickfield ................. H02J 3/14 700/286 |
| 2004/0021679 | A1 | 2/2004 | Chapman et al. |
| 2004/0128314 | A1 | 7/2004 | Katibah et al. |
| 2004/0193420 | A1 | 9/2004 | Kennewick et al. |
| 2005/0055308 | A1 | 3/2005 | Meyer et al. |
| 2005/0154494 | A1 | 7/2005 | Ahmed |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0253205 | A1 | 11/2006 | Gardiner |
| 2006/0265751 | A1 | 11/2006 | Cosquer et al. |
| 2006/0271589 | A1 | 11/2006 | Horowitz et al. |
| 2007/0033005 | A1 | 2/2007 | Cristo et al. |
| 2007/0067062 | A1 | 3/2007 | Mairs et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2008/0034425 | A1 | 2/2008 | Overcash et al. |
| 2008/0094230 | A1 | 4/2008 | Mock et al. |
| 2008/0097816 | A1 | 4/2008 | Freire et al. |
| 2008/0186160 | A1 | 8/2008 | Kim et al. |
| 2008/0252723 | A1 | 10/2008 | Park |
| 2008/0281472 | A1 | 11/2008 | Podgorny et al. |
| 2009/0195349 | A1 | 8/2009 | Frader-Thompson et al. |
| 2010/0005439 | A1 | 1/2010 | Shikata |
| 2010/0045439 | A1 | 2/2010 | Tak et al. |
| 2010/0274366 | A1 | 10/2010 | Fata et al. |
| 2010/0281387 | A1 | 11/2010 | Holland et al. |
| 2010/0287130 | A1 | 11/2010 | Guralnik et al. |
| 2010/0324962 | A1 | 12/2010 | Nesler et al. |
| 2011/0015802 | A1 | 1/2011 | Imes |
| 2011/0047418 | A1 | 2/2011 | Drees et al. |
| 2011/0061015 | A1 | 3/2011 | Drees et al. |
| 2011/0077950 | A1 | 3/2011 | Hughston |
| 2011/0087650 | A1 | 4/2011 | Mackay et al. |
| 2011/0087988 | A1 | 4/2011 | Ray et al. |
| 2011/0088000 | A1 | 4/2011 | Mackay |
| 2011/0125737 | A1 | 5/2011 | Pothering et al. |
| 2011/0137853 | A1 | 6/2011 | Mackay |
| 2011/0153603 | A1 | 6/2011 | Adiba et al. |
| 2011/0154363 | A1 | 6/2011 | Karmarkar |
| 2011/0178977 | A1 | 7/2011 | Drees |
| 2011/0191343 | A1 | 8/2011 | Heaton et al. |
| 2011/0205022 | A1 | 8/2011 | Cavallaro et al. |
| 2011/0218777 | A1 | 9/2011 | Chen et al. |
| 2012/0011126 | A1 | 1/2012 | Park et al. |
| 2012/0011141 | A1 | 1/2012 | Park et al. |
| 2012/0022698 | A1 | 1/2012 | Mackay |
| 2012/0062577 | A1 | 3/2012 | Nixon |
| 2012/0064923 | A1 | 3/2012 | Imes et al. |
| 2012/0100825 | A1 | 4/2012 | Sherman et al. |
| 2012/0101637 | A1 | 4/2012 | Imes et al. |
| 2012/0135759 | A1 | 5/2012 | Imes et al. |
| 2012/0158633 | A1 | 6/2012 | Eder |

(56) References Cited

U.S. PATENT DOCUMENTS

| | | |
|---|---|---|
| 2012/0259583 A1 | 10/2012 | Noboa et al. |
| 2012/0278051 A1 | 11/2012 | Jiang et al. |
| 2012/0296451 A1 | 11/2012 | Kaps et al. |
| 2013/0007063 A1 | 1/2013 | Kalra et al. |
| 2013/0038430 A1* | 2/2013 | Blower .............. H04W 72/082 340/12.22 |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0173062 A1 | 7/2013 | Koenig-Richardson |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0275174 A1 | 10/2013 | Bennett et al. |
| 2013/0283172 A1 | 10/2013 | Cross et al. |
| 2013/0298244 A1 | 11/2013 | Kumar et al. |
| 2013/0331995 A1 | 12/2013 | Rosen |
| 2014/0018940 A1 | 1/2014 | Casilli |
| 2014/0032506 A1 | 1/2014 | Hoey et al. |
| 2014/0081652 A1 | 3/2014 | Klindworth |
| 2014/0122077 A1 | 5/2014 | Nishikawa et al. |
| 2014/0135952 A1 | 5/2014 | Maehara |
| 2014/0172184 A1 | 6/2014 | Schmidt et al. |
| 2014/0189861 A1 | 7/2014 | Gupta et al. |
| 2014/0269614 A1 | 9/2014 | Maguire et al. |
| 2014/0277765 A1* | 9/2014 | Karimi ................... G05B 15/02 700/276 |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0112763 A1 | 4/2015 | Goldschneider |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1* | 6/2015 | Borrelli ................... G06F 30/20 703/7 |
| 2015/0185261 A1 | 7/2015 | Frader-Thompson et al. |
| 2015/0186777 A1 | 7/2015 | Lecue et al. |
| 2015/0204563 A1 | 7/2015 | Imes et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0341212 A1 | 11/2015 | Hsiao et al. |
| 2015/0348417 A1 | 12/2015 | Ignaczak et al. |
| 2015/0356419 A1 | 12/2015 | Shircliff et al. |
| 2016/0033946 A1 | 2/2016 | Zhu et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0118236 A1 | 4/2017 | Devi Reddy et al. |
| 2017/0118237 A1 | 4/2017 | Devi Reddy et al. |
| 2017/0118240 A1 | 4/2017 | Devi Reddy et al. |
| 2017/0123389 A1 | 5/2017 | Baez et al. |
| 2017/0134415 A1 | 5/2017 | Muddu et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0277769 A1 | 9/2017 | Pasupathy et al. |
| 2017/0278003 A1 | 9/2017 | Liu |
| 2017/0315522 A1* | 11/2017 | Kwon ................. H04L 61/2007 |
| 2017/0315697 A1 | 11/2017 | Jacobson et al. |
| 2017/0316061 A1 | 11/2017 | Hubauer et al. |
| 2017/0322534 A1 | 11/2017 | Sinha et al. |
| 2017/0323389 A1 | 11/2017 | Vavrasek |
| 2017/0329289 A1* | 11/2017 | Kohn ....................... F24F 11/62 |
| 2017/0329867 A1 | 11/2017 | Lindsley |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gartner et al. |
| 2018/0048485 A1 | 2/2018 | Pelton et al. |
| 2018/0069932 A1* | 3/2018 | Tiwari ................... G01S 5/0252 |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0299840 A1 | 10/2018 | Sinha et al. |
| 2018/0315299 A1 | 11/2018 | Subramanian et al. |
| 2018/0315300 A1 | 11/2018 | Subramanian et al. |
| 2018/0336785 A1 | 11/2018 | Ghannam et al. |
| 2018/0341255 A1 | 11/2018 | Turney et al. |
| 2018/0359111 A1 | 12/2018 | Harvey |
| 2018/0364654 A1 | 12/2018 | Locke et al. |
| 2019/0003297 A1 | 1/2019 | Brannigan et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0095820 A1 | 3/2019 | Pourmohammad |
| 2019/0095821 A1 | 3/2019 | Pourmohammad |
| 2019/0096014 A1 | 3/2019 | Pourmohammad et al. |
| 2019/0096212 A1 | 3/2019 | Pourmohammad et al. |

(56) References Cited

U.S. PATENT DOCUMENTS

| | | | |
|---|---|---|---|
| 2019/0096213 A1 | 3/2019 | Pourmohammad et al. |
| 2019/0096214 A1 | 3/2019 | Pourmohammad |
| 2019/0096217 A1 | 3/2019 | Pourmohammad et al. |
| 2019/0102840 A1 | 4/2019 | Perl et al. |
| 2019/0123931 A1 | 4/2019 | Schuster et al. |
| 2019/0129403 A1 | 5/2019 | Turney et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0243352 A1 | 8/2019 | Horgan et al. |
| 2019/0243813 A1 | 8/2019 | Pourmohammad et al. |
| 2019/0258620 A1 | 8/2019 | Itado et al. |
| 2019/0268178 A1 | 8/2019 | Fairweather et al. |
| 2019/0271978 A1 | 9/2019 | Elbsat et al. |
| 2019/0295034 A1 | 9/2019 | Wenzel et al. |
| 2019/0310979 A1 | 10/2019 | Masuzaki et al. |
| 2019/0311332 A1 | 10/2019 | Turney et al. |
| 2019/0325368 A1 | 10/2019 | Turney et al. |
| 2019/0347622 A1 | 11/2019 | Elbsat et al. |
| 2019/0355240 A1 | 11/2019 | Razak et al. |
| 2019/0361412 A1* | 11/2019 | Park .................. G06N 5/043 |
| 2019/0383510 A1 | 12/2019 | Murugesan et al. |
| 2019/0384239 A1 | 12/2019 | Murugesan et al. |
| 2019/0385070 A1 | 12/2019 | Lee et al. |
| 2020/0073342 A1 | 3/2020 | Lee et al. |
| 2020/0076196 A1 | 3/2020 | Lee et al. |
| 2020/0092127 A1 | 3/2020 | Park et al. |
| 2020/0106633 A1 | 4/2020 | Park et al. |
| 2020/0285203 A1 | 9/2020 | Thakur et al. |
| 2021/0056386 A1 | 2/2021 | Murugesan et al. |
| 2021/0056409 A1 | 2/2021 | Murugesan et al. |
| 2021/0056452 A1 | 2/2021 | Murugesan et al. |

FOREIGN PATENT DOCUMENTS

| | | |
|---|---|---|
| CN | 106960269 A | 7/2017 |
| CN | 107147639 A1 | 9/2017 |
| CN | 107598928 A | 1/2018 |
| EP | 3 324 306 | 5/2018 |
| JP | 2008-107930 A | 5/2008 |
| KR | 2016/0102923 A | 8/2016 |
| WO | WO-2007/125108 A1 | 11/2007 |
| WO | WO-2009/020158 A1 | 2/2009 |
| WO | WO-2011/100255 A2 | 8/2011 |
| WO | WO-2012/110089 | 8/2012 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

U.S. Appl. No. 16/549,037, filed Aug. 23, 2019, Johnson Controls Technology Co.
U.S. Appl. No. 16/549,656, filed Aug. 23, 2019, Johnson Controls Technology Co.
U.S. Appl. No. 16/549,744, filed Aug. 23, 2019, Johnson Controls Technology Co.
Abras et al., A Multi-Agent Home Automation System for Power Management, Jan. 1, 2008, 10 pages.
Search Report for International Application No. PCT/US2018/042327, dated Nov. 7, 2018, 14 pages.
International Search Report and Written Opinion on PCT/US2020/058381, dated Jan. 27, 2021, 30 pages.
Balaji et al., "Brick: Towards a Unified Metadata Schema for Buildings," dated Nov. 16-17, 2016, 10 pages.
Balaji et al., Brick: Metadata schema for portable smart building applications, dated Sep. 25, 2017, 20 pages.
Balaji et al., Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, dated Nov. 4-5, 2015, 4 pages.
Brick A uniform metadata schema for buildings, 7 pages, dated Oct. 22, 2019, Brickschema.org.
Brick: Metadata schema for portable smart building applications, dated Sep. 15, 2018, 3 pages, (Abstract).
Brick: Towards a Unified Metadata Schema For Buildings, dated Nov. 16, 2016, 46 pages.
Building Blocks for Smart Buildings, BrickSchema.org, dated Mar. 2019, 17 pages.
Extended European Search Report issued in EP Application No. 18196948.6 dated Apr. 10, 2019, 9 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
Koh et al., "Scrabble: Transferrable Semi-Automated Semantic Metadata Normalization using Intermediate Representation," dated Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Koh, et al., Poster: Scrabble: Converting Unstructured Metadata into Brick for Many Buildings, 2 pages, Dated Nov. 8-9, 2017.
Koh, et al., Scrabble: Converting Unstructured Metadata into Brick for Many Buildings, UCSanDiego, 2017, 1 page.
Li et al., Event Stream Processing with Out-of-Order Data Arrival, International Conferences on Distributed Computing Systems, 2007, 8 pages.
Metadata Schema for Buildings, 3 pages, Brickschema.org (Cannot confirm date.).
Office Action on EP 18755340.9, dated Feb. 25, 2020, 3 pages.

(56) References Cited

OTHER PUBLICATIONS

Results of the Partial International Search for PCT/US2018/052971, dated Jan. 3, 2019, 3 pages.
Wei et al., "Development and Implementation of Software Gateways of Fire Fighting Subsystem Running on EBI," Control, Automation and Systems Engineering, IITA International Conference on, IEEE, Jul. 2009, pp. 9-12.

* cited by examiner

| Temp_Before | Damper_Position | Temp_After | observation | probability |
|---|---|---|---|---|
| 68 | Open_15 | 70 | 1 | 1 |

| Temp_Before | Damper_Position | Temp_After | Opportunities | observations | probability |
|---|---|---|---|---|---|
| 68 | Open_15_Degree | 70 | 385 | 9 | 2.3 |
| 68 | Open_15_Degree | 69 | 385 | 88 | 22.9 |
| 68 | Open_15_Degree | 70 | 385 | 198 | 51.4 |
| 68 | Open_15_Degree | 71 | 385 | 76 | 19.7 |
| 68 | Open_15_Degree | 72 | 385 | 13 | 3.4 |
| 68 | Open_15_Degree | 73 | 385 | 1 | 0.3 |
| 68 | Close_15_Degree | 65 | 369 | 5 | 1.3 |
| 68 | Close_15_Degree | 66 | 369 | 93 | 25.2 |
| 68 | Close_15_Degree | 67 | 369 | 158 | 42.8 |
| 68 | Close_15_Degree | 68 | 369 | 72 | 19.5 |
| 68 | Close_15_Degree | 70 | 369 | 41 | 11 |

SYSTEMS AND METHODS FOR AGENT BASED BUILDING SIMULATION FOR OPTIMAL CONTROL

CROSS-REFERENCE TO RELATED APPLICATIONS

This application claims the benefit of and priority to U.S. Provisional Patent Application No. 62/533,581 filed Jul. 17, 2017, the entire disclosure of which is incorporated by reference herein.

BACKGROUND

The present disclosure relates generally to building management systems (BMS). The present disclosure relates more particularly to systems and methods for agent based building simulations for providing optimal control of the BMS.

A BMS is, in general, a system of devices configured to control, monitor, and manage equipment in or around a building or building area. Buildings, such as commercial buildings, typically have a variety of systems installed. The systems are used to manage the security, fire, access control, video surveillance, and environmental factors that relate to the building and the occupants thereof. Such systems may each perform discrete operations. Further, the components and devices within each system are typically manufactured by different corporations, and therefore often do not interact directly or easily with each other. In some instances, BMS systems have been implemented to monitor the data being generated by each system, and to subsequently use that data to direct the operation of other systems or group of systems as a whole. For example, some BMS systems monitor the fire detection systems, and can shut down the air intake fans when a fire is detected. These systems may also interact with transportations systems, such as escalators, such that they all operate in a direction that moves occupants toward the building exits. Similarly, these systems may control elevator cars to either stop at the closest floor or brought to the lobby, or other egress point. Such functionality allows the building systems to automatically react appropriately to any threat to the building occupants. However, such reactions are generally scripted (or pre-programmed), and in some cases, could cause unwanted situations due to the predefined nature of the programmed actions.

SUMMARY

One implementation of the present disclosure is a system for a building management system (BMS) simulation. The system includes one or more processors and memory connected to the one or more processors. The memory has instructions stored thereon that when executed by the one or more processors, cause the one or more processors to generate a space agent representing a space in a building, the space agent configured to maintain an environmental condition of the space based on an optimization state of the space, generate an equipment agent representing a device that serves the space, and register the space agent and the equipment agent to a space communication channel associated with the space. The space agent is configured to communicate with the equipment agent over the space communication channel.

In some embodiments, the environmental condition may correspond to a temperature setpoint.

In some embodiments, the space agent may be configured to set the temperature setpoint based on the optimization state.

In some embodiments, the instructions may further cause the one or more processors to generate a control agent having control logic to control the environmental condition of the space, and register the control agent to the space communication channel associated with the space. In some embodiments, the control agent may be configured to communicate with the space agent over the space communication channel to provide the control logic to the space agent.

In some embodiments, the space agent may be configured to communicate with the equipment agent and the control agent by publishing messages to the space communication channel and receiving messages published by the equipment agent and the control agent from the space communication channel.

In some embodiments, the control logic may correspond to the optimization state.

In some embodiments, the control logic may override the optimization state.

In some embodiments, the space may be a room within the building, and the instructions may further cause the one or more processors to generate a floor agent representing a floor within the building on which the room is located, and register the floor agent and the space agent to a floor communication channel associated with the floor. In some embodiments, the floor agent may be configured to communicate with the space agent over the floor communication channel.

In some embodiments, the instructions may further cause the one or more processors to generate a building agent representing the building, and register the building agent and the floor agent to a building communication channel associated with the building. In some embodiments, the building agent may be configured to communicate with the floor agent over the building communication channel.

In some embodiments, the building agent may be configured to override controls of each of the other agents by publishing messages on the building communication channel, and the floor agent may be configured to override controls of the space agent by publishing messages on the floor communication channel.

Another implementation of the present disclosure is a method for simulating a building management system, the method including generating, by one or more processors, a space agent representing a space in a building, the space agent configured to maintain an environmental condition of the space based on an optimization state of the space, generating, by the one or more processors, an equipment agent representing a device that serves the space, and registering, by the one or more processors, the space agent and the equipment agent to a space communication channel associated with the space. The space agent is configured to communicate with the equipment agent over the space communication channel.

In some embodiments, the environmental condition may correspond to a temperature setpoint.

In some embodiments, the space agent may be configured to set the temperature setpoint based on the optimization state.

In some embodiments, the method may further include generating, by the one or more processors a control agent having control logic to control the environmental condition of the space, and registering, by the one or more processors, the control agent to the space communication channel associated with the space. In some embodiments, the control agent may be configured to communicate with the space agent over the space communication channel to provide the control logic to the space agent.

In some embodiments, the space agent may be configured to communicate with the equipment agent and the control agent by publishing messages to the space communication channel and receiving messages published by the equipment agent and the control agent from the space communication channel.

In some embodiments, the control logic may correspond to the optimization state.

In some embodiments, the control logic may override the optimization state.

In some embodiments, the space may be a room within the building, and the method may further include generating, by the one or more processors, a floor agent representing a floor within the building on which the room is located, and registering, by the one or more processors, the floor agent and the space agent to a floor communication channel associated with the floor. In some embodiments, the floor agent may be configured to communicate with the space agent over the floor communication channel.

In some embodiments, the method may further include generating, by the one or more processors, a building agent representing the building, and registering, by the one or more processors, the building agent and the floor agent to a building communication channel associated with the building. In some embodiments, the building agent may be configured to communicate with the floor agent over the building communication channel.

In some embodiments, the building agent may be configured to override controls of each of the other agents by publishing messages on the building communication channel, and the floor agent may be configured to override controls of the space agent by publishing messages on the floor communication channel.

Those skilled in the art will appreciate that the summary is illustrative only and is not intended to be in any way limiting. Other aspects, inventive features, and advantages of the devices and/or processes described herein, as defined solely by the claims and their equivalents, will become apparent in the detailed description set forth herein and taken in conjunction with the accompanying drawings.

DETAILED DESCRIPTION

As shown in the Figures, a building management system (BMS) utilizing agent based building simulation to provide optimal control is shown. Agent based BMS control systems are further described in U.S. Pat. No. 9,817,383 (application. Ser. No. 15/367,167), filed Dec. 1, 2016, the entire content of which is incorporated by reference herein. Agent based BMS dynamic channel communications are further described in U.S. patent application Ser. No. 15/934,593, filed Mar. 23, 2018, the entire content of which is incorporated by reference herein.

In various embodiments of the present disclosure, various agents are used to simulate a building or system, so that each space, equipment, and/or control functions for the building or system is simulated by a software agent. For example, according to various embodiments, various agents are used to simulate, control, and/or monitor any suitable environmental or operational aspects of a building, such as temperature, humidity, particulate count, occupancy time (actual and/or expected), lighting, audio/visual, fire safety, electrical, security, access control, lifts/escalators, and/or the like. The use of agents to aid in simulation of a building or system provide multiple advantages to a BMS systems. For example, agent based building simulation may allow for a single integrated system from design to commissioning to operations.

Agent based building simulation also allows for heavy use and reuse of design inputs, as well as for ease of commissioning (e.g. such as by eliminating the need for explicit point binding.) Agents, such as space agents, equipment agents, and control agents may be used, and may allow for goal-oriented optimization within the BMS. For example, each of the agents may communicate with each other via communication channels to achieve a particular optimization for a particular zone or space. Further, agents can be used to allow for agile deployment of new features (e.g. via the agents) when the BMS is in operations mode. The agents can be run on different devices within the system (e.g. cloud, server, controller, smartboards, etc.) and can allow for system scalability without complexity (e.g. via agents forming building blocks.) Additionally, cloud replicas or virtual simulations of a building can allow for analytics and machine learning to be performed.

Building Management System and HVAC System

Figure 1:
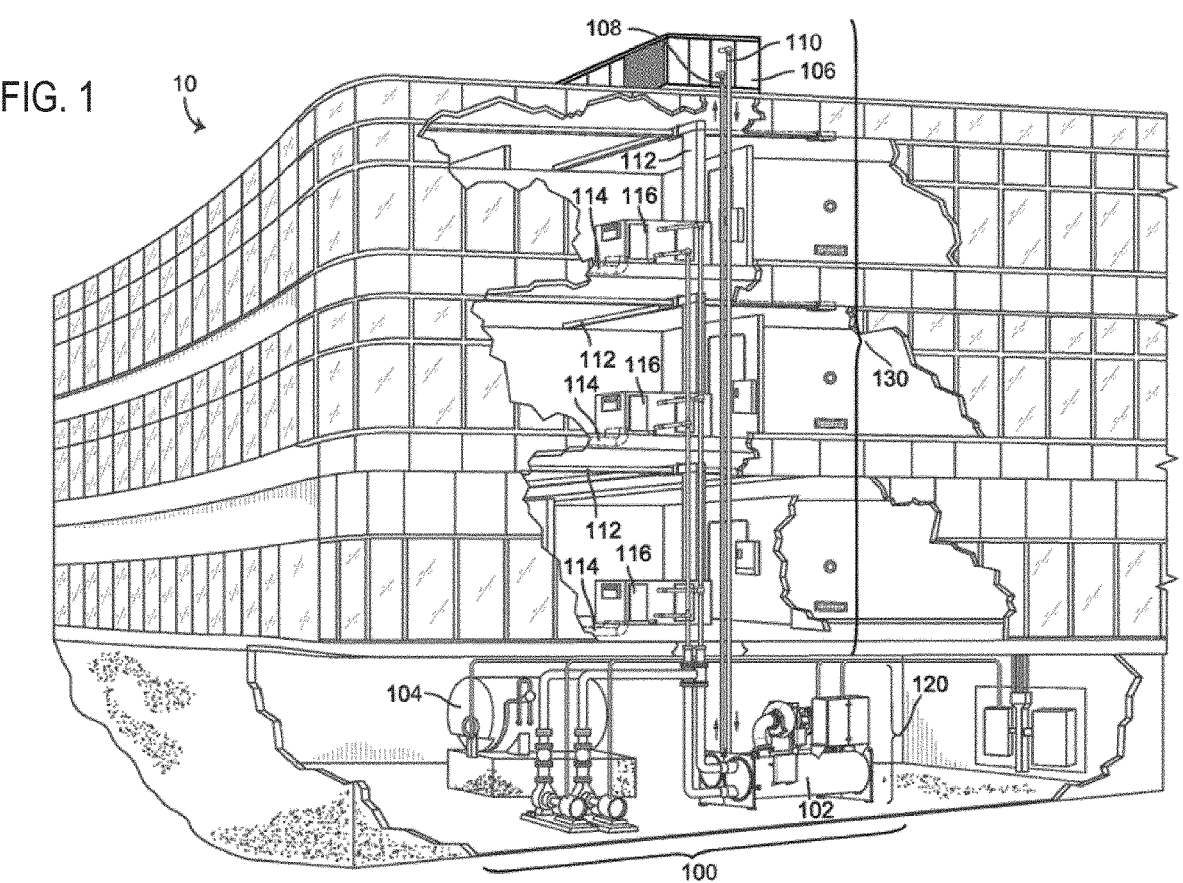
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination thereof. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
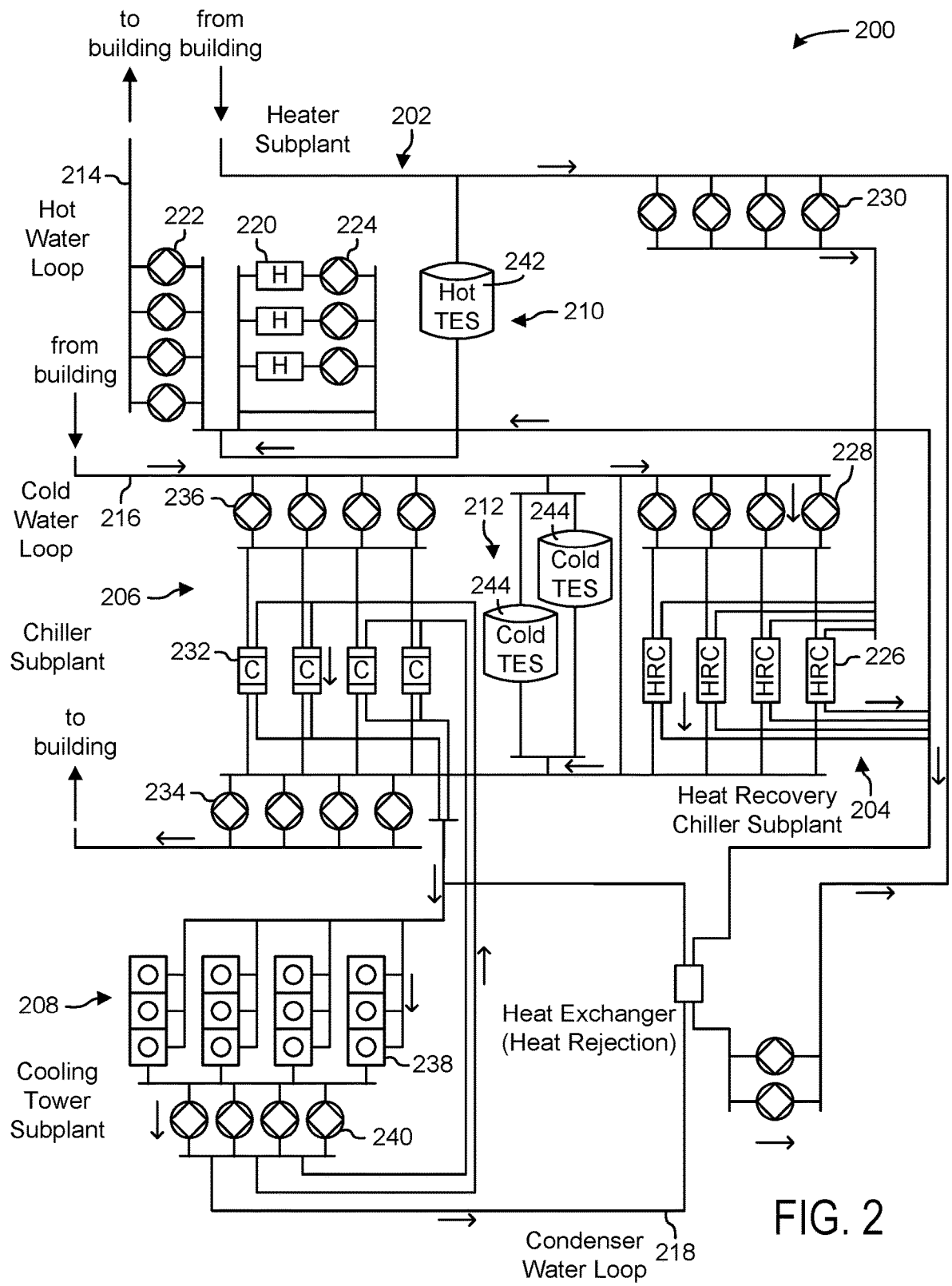
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
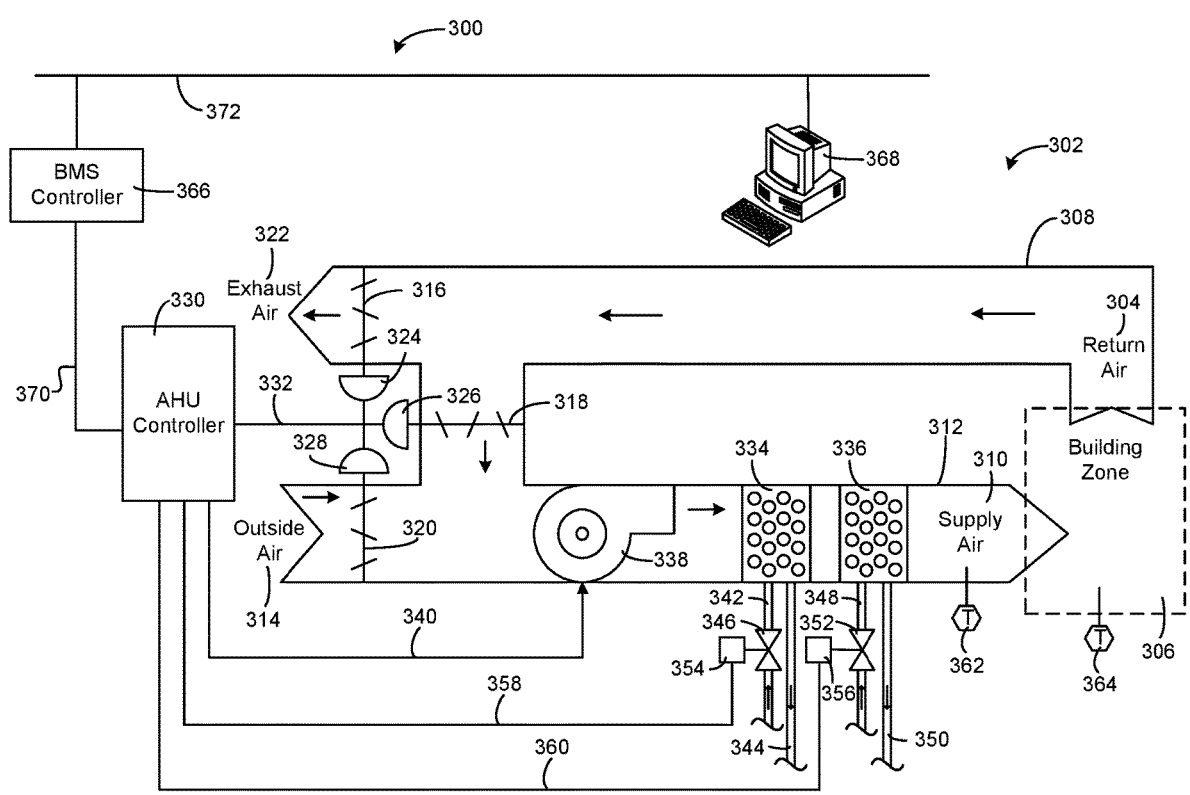
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
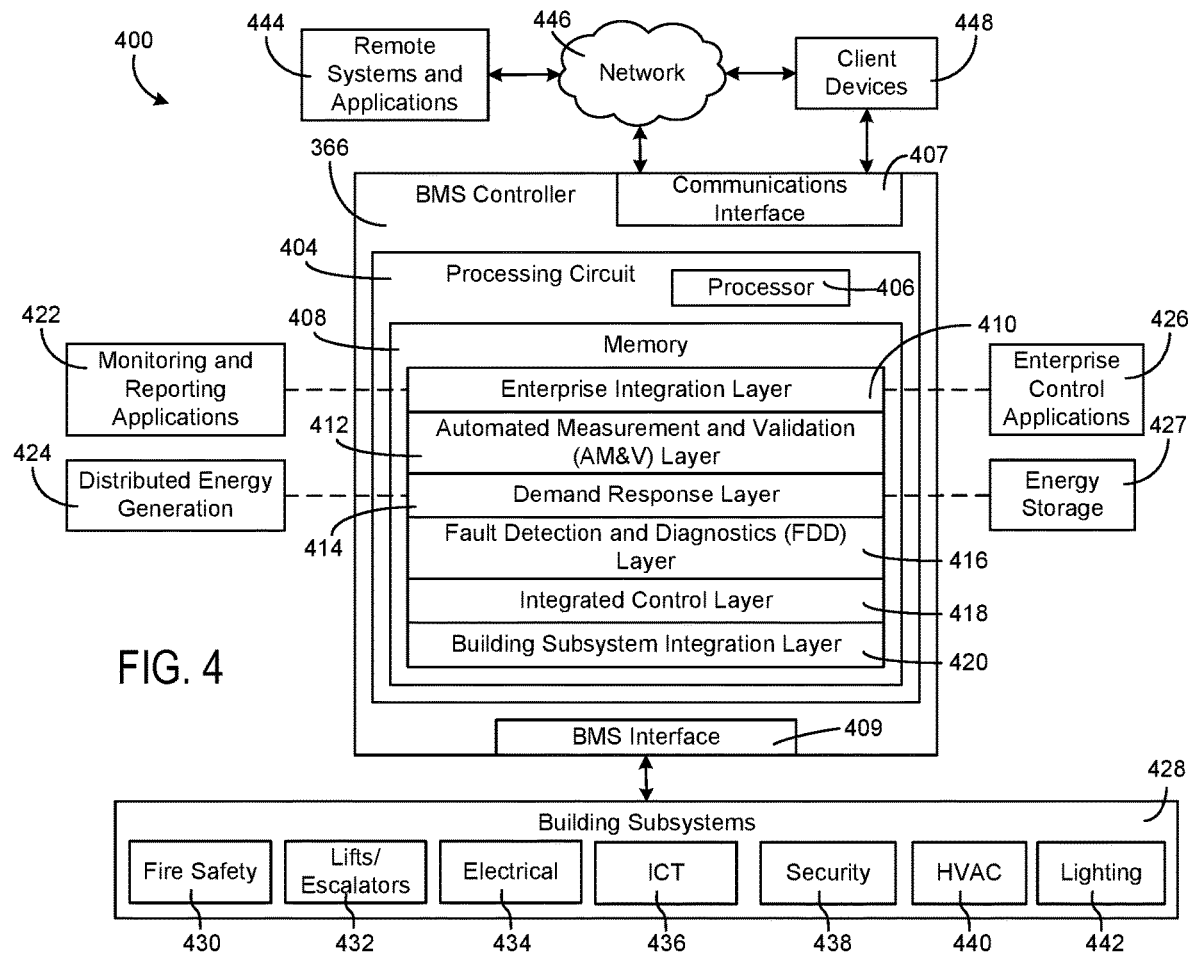
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both the communications interface 407 and the BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Adaptive Agent Based Control System

Referring now to F. The system 500 may be any of the BMS systems described above. Further, the system 500 may be a peer-to-peer (P2P) network, such as a Verisys system from Johnson Controls. The system 500 may include a controller 502. The controller 502 may be a dedicated controller within a BMS. In one embodiment, the controller 502 is a cloud based server (e.g., an internet based server).

For example, the controller 502 may be physically located in one or more server farms and accessible via an internet connection. In some examples, the controller may be a standalone device in a peer-to-peer (P2P) network, such as a Verisys system from Johnson Controls. The controller 502 may include a processing circuit 504 including an adaptive interaction manager 506. The processing circuit 504 may include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in the memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 via the processing circuit 504 and may include computer code for executing (e.g., by the processor 508) one or more processes described herein. When the processor 508 executes instructions stored in the memory 510, the processor 508 generally configures the processing circuit 504 to complete such activities.

The memory 510 may include the adaptive interaction manager 506, a learning engine 512, and an agent manager 514. The learning engine 512 may be used to generate and access historical information, user feedback information, etc. In one embodiment, the learning engine 512 may access a database 516 via the processing circuit 504. The database 516 may include data relating to one or more BMS's, such as building layouts, system schematics, device information, control schemes, environmental ratings, historical data, etc. In one embodiment, the database 516 includes contextual information. The contextual information may include dictionaries, historical data, scripts, and/or other data for interpreting contextual information. The database 516 may further include a knowledgebase, which may include previous commands, user responses, generated outputs, device information, agent specific learning, etc. The database 516 may further include one or more inferences. The inferences may include contextual inferences, historical inferences, etc. In some embodiments, the learning engine 512 may provide the inferences to the database 516. The learning engine 512 may further update the inferences, as well as other data, of the database 516 over time. The learning engine 512 may further access data within the database 516 to aid in the generation of agents, as will be discussed below. The database 516 may further include one or more universal truths associated with the system 500. In one embodiment, the universal truths may be associated with one or more BMS controllers or devices within the system 500. In one embodiment, the universal truths may be arranged in a universal truth table, which may be populated with universal truths for a given system, such as system 500. Example universal truths may include a defined communication schemes between BMS devices and/or controllers.

Figure 5:
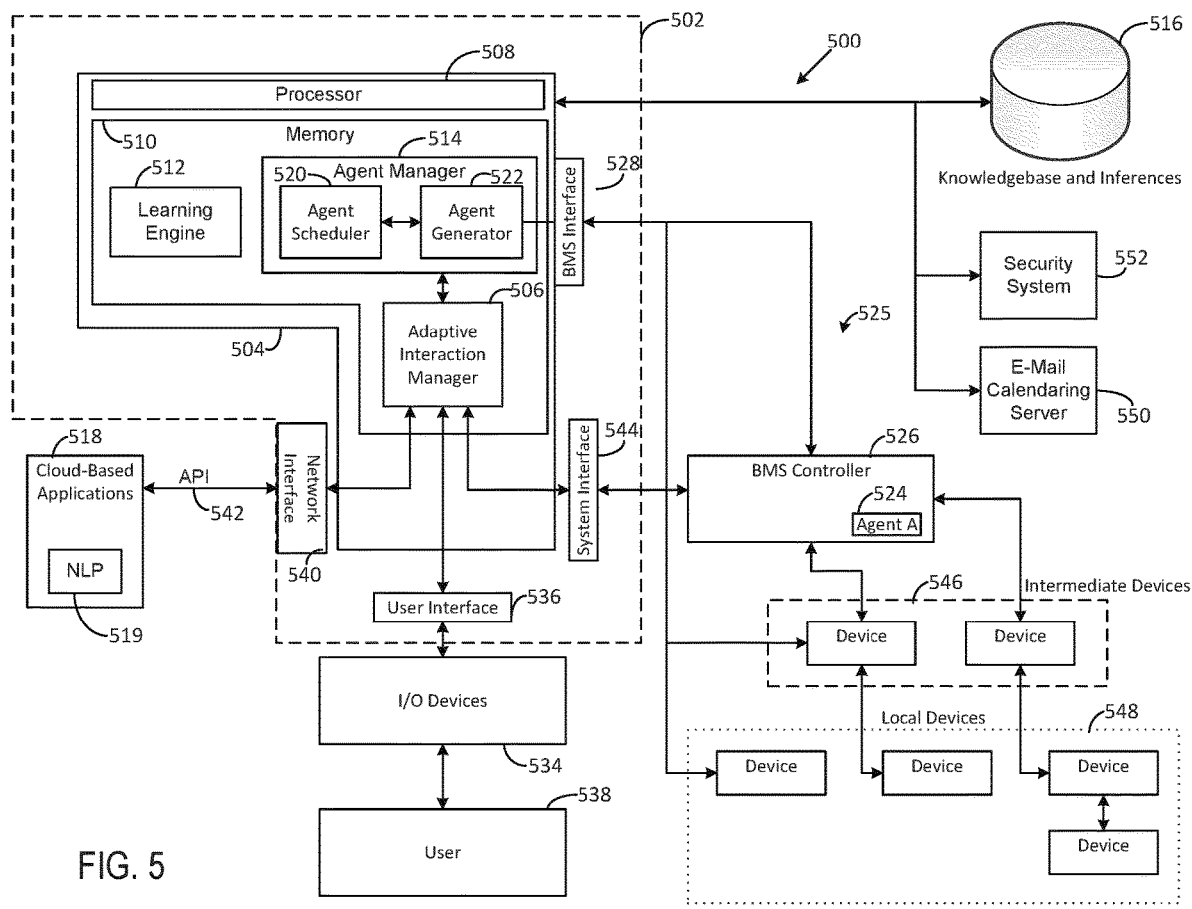
FIG. 5 is a block diagram illustrating an adaptive agent based control system, according to some embodiments.

The agent manager 514 is further shown to include an agent scheduler 520 and an agent generator 522. In some embodiments, the agent scheduler 520 maintains a record of all agents previously generated and active within the system 500. Further the agent scheduler 520 may also maintain real time data relating to which agents are currently active, and which agents are not currently active. The agent scheduler may further maintain real time data relating to which device within the system 500 a particular agent is currently associated with. For example, as shown in FIG. 5, agent 'A' 524 is associated with a BMS controller 526 within a BMS 525 of the system 500. The BMS 525 can be any combination of BMS devices as described above in regards to FIGS. 1-4. Further, the BMS 525 can be understood to be a residential system, such as a home controller. The BMS controller 526 may be any BMS controller, as described above in regards to FIGS. 1-4. Alternatively, the BMS controller 526 may be a dedicated BMS interface device, such as an Athens Smart Hub device from Johnson Controls. The agent scheduler 520 may, therefore, maintain a record of the agent 'A' 524 being associated with the BMS controller 526, as well as the current status of the agent 'A' 524.

The agent generator 522 may generate a number of agents, such as agent 'A' 524, for use in the system 500. The agents, as described herein, may be software applications that can run automated tasks (scripts). For example, the agents may be software applications that can read and/or write data to one or more devices of the system. In one embodiment, the agents may be able to generate their own software, and inject the software into one or more devices that it is associated with. The agents may further be capable of communicating with other agents, as will be described in more detail below, along with a more detailed description of the agents generally. The agent generator 522 may generate an agent based on information received from the adaptive interaction manager 506. In some embodiment, the agents are generated to perform a defined task. In other embodiments, the agents are generated to perform a defined set of tasks. In still further embodiments, the agents are generated having a desired goal, and allowed to determine how to meet the desired goal. In some examples, a generalized framework can be provided to a generated agent to provide constraints as to how the goal may be achieved. In further embodiments, the agent generator 522 may modify an existing agent. For example, the agent generator 522 may modify an existing agent to provide more functionality. In other examples, the agent generator 522 may update the agent with additional information related to the device the agent is associated with, such as a new firmware ("FW") update, or additional hardware (e.g. a new I/O board for a controller).

The agent generator 522 may communicate the generated agents to the BMS 525 via a BMS interface 528. The BMS interface 528 may be a serial interface, such as RS-232 or RS-485. In one embodiment, the BMS interface 528 is a universal asynchronous receiver/transmitter ("UART"). In other examples, the BMS interface 528 may be a wireless interface such as cellular, Wi-Fi, Zigbee, Bluetooth, RF, LoRa, etc. Additionally, the BMS interface 528 may include other wired interfaces such as USB, Firewire, Lightning Connectors, CAT5 (wired internet), etc. The agent generator 522 may further communicate the generated agents to the system 500 via an adaptive interaction manager interface 530. The adaptive interaction manager interface 506 may allow the agent generator 522, as well as the processing circuit 504 in general, to communicate with the adaptive interaction manager 506 via a corresponding processing circuit interface 532. Similar to above, the adaptive interaction manager interface 530 may be a serial interface, such as RS-232 or RS-485. In one embodiment, the adaptive interaction manager interface 530 is a UART interface. In still other examples, the adaptive interaction manager interface 530 may be a wireless interface such as cellular, Wi-Fi, Zigbee, Bluetooth, RF, LoRa, etc. Additionally, the adaptive interaction manager interface 530 may include other wired interfaces such as USB, Firewire, Lightning Connectors, CAT5 (wired internet), etc.

In some embodiments, the adaptive interaction manager 506 provides communication between one or more I/O devices 534, one or more cloud-based applications 518, the processing circuit 504, and one or more devices, such as the BMS controller 526. The adaptive interaction manager 506 is shown to interact with a user interface 536 for communicating with the one or more I/O devices 534. In one embodiment, the user interface 536 may be a wireless interface such as cellular (3G, 4G, LTE, CDMA, etc.), Wi-Fi, Zigbee, Bluetooth, RF, LoRa, etc. Additionally, the user interface 536 may include other wired interfaces such as USB, Firewire, Lightning Connectors, CAT5 (wired internet), UART, serial (RS-232, RS-485), etc. The I/O devices 534 may be any device capable of communicating to the adaptive interaction manager 506, as well as providing a device for a user 538 to interface with the system 500. Example I/O devices 534 may include personal computing devices such as smart phones (iPhone, Android phone, Windows phone), tablet computers (iPad, Android Tablet, Windows Surface, etc.), laptop computers, and/or desktop computers. Example I/O devices may further include a stand-alone device such as an Amazon Echo, or even a non-mobile device such as a voice capable thermostat, or other dedicated I/O devices.

The adaptive interaction manager 506 may communicate with the cloud-based applications 518 via a network interface 540. The network interface 540 may be an internet based interface, such as Wi-Fi, CAT5, cellular (3G, 4G, LTE, CDMA, etc.), etc. However, other interfaces, such as Zigbee, Bluetooth, RF, LoRa, etc., are also considered. In one embodiment, the adaptive interaction manager 506 may communicate with the cloud-based applications 518 via one or more APIs 542. In one embodiment, the APIs 542 are proprietary APIs for interfacing the adaptive interaction manager 506 with the cloud based applications 518. In one example, the APIs 542 can be web hosted APIs provided by a third party provider, such as Amazon Cloud Services, Google, Apple, Microsoft, etc. In some embodiments, the APIs 542 interface with a proprietary voice recognition application, such as a voice recognition application from Johnson Controls. In other examples, the APIs 542 can interface with gesture recognition APIs, such as those from Johnson Controls. Further examples of possible APIs 542 can include enterprise resource planning (ERP), or other enterprise management software APIs for interfacing with a company or facility enterprise system (e.g. SAP). Other possible APIs 542 may include e-mail and/or calendaring interface APIs, for interfacing with an e-mail/calendaring system such as Microsoft Outlook, Apple Mail, Google Gmail, Lotus Notes, etc.

In one embodiment, the APIs 542 interface with the cloud-based applications 518. The cloud based applications 518 may be supplied by third parties. For example, the cloud based applications 518 may include voice to text applications, such as Amazon Voice Services, Google Voice, Apple's Siri, or Microsoft's Cortana. The cloud based applications 518 may further include gesture recognition applications such as those used by Microsoft Kinect. Further, other cloud based applications 518 can include personal assistant applications such as Apple's Siri, and Microsoft's Cortana. By utilizing one or more cloud based applications on a remote server, the system 500 can leverage more sophisticated and powerful contextual data processing technology than would be applicable to install on an individual server, system, or device. For example, cloud based voice recognition applications can provide as high as 95% natural voice recognition accuracy. In other embodiments, the cloud-based applications 518 may include a natural language processor 519. The natural language processor 519 may be a voice to text application, such as those described above. In other embodiments, the natural language processor 519 may be used to processes natural language text into computer executable commands. For example, the natural language processor 519 may be able to analyze text provided to the system 500, such as via e-mail or text message, and process the natural language text into a format readable by the controller 502. While the natural language processor 519 is shown as part of the cloud-based applications 518, it is considered that the natural language processor 519 may be separate from the cloud based applications 518, and communicate directly with the adaptive interaction manager 506. In further embodiments, the natural language processor 519 may be integrated into the controller 502.

The adaptive interaction manager 506 may further be in communication with one or more systems or devices associated with a facility or building. As shown in FIG. 5, example systems and devices can include a BMS controller 526. The adaptive interaction manager 506 may communicate with the system via a system interface 544. The system interface 544 may be a serial interface, such as RS-232 or RS-485. In one embodiment, the system interface 544 is a UART interface. In still other examples, the system interface 544 may be a wireless interface such as cellular, Wi-Fi, Zigbee, Bluetooth, RF, LoRa, etc. Additionally, the system interface 544 may include other wired interfaces such as USB, Firewire, Lightning Connectors, CAT5 (wired internet), etc. While FIG. 5 shows the adaptive interaction manager 506 communicating with a BMS controller 526 of the system 500, the adaptive interaction manager 506 may communicate with any suitable device associated with the BMS 525. For example, the adaptive interaction manager 506 may be able to interface with the BMS controller 526, one or more intermediate devices 546, and/or one or more local device 548. Example intermediate devices may include device controllers, sub-system controllers, RTU's, AHU's, etc. Example local devices may include thermostats, valves, switches, actuators, etc. In one embodiment, system interface 544 may communicate with the BMS 525 via a network connection, such as a BACnet network connection. However, other networks, such as Ethernet, Local Area Network, etc., are also considered.

The adaptive interaction manager 506 may further interact with other systems associated with the BMS 525. Example system may include an e-mail calendaring server 550, a security system 552, etc. Via the BMS 525, the e-mail calendaring server 550, the security system 552, and/or other systems may all provide data to the adaptive interaction manager 506, which can process the information, as will be described in more detail below. In one embodiment, the e-mail calendaring server 550, the security system 552, and/or other systems may provide contextual data to the adaptive interaction manager 506. In one embodiment, the adaptive interaction manager 506, via the system interface 544, communicates with the one or more systems or devices using one or more network connections. For example, the network connections may include a wired connection to the internet. However, other network connections are contemplated such as wireless connections, for example, such as cellular, Wi-Fi, Zigbee, Bluetooth, RF, LoRa, etc. Additionally, other network connections such as serial connections (RS-485, RS-232, USB), or other connections such as Firewire, Lightning Connectors, etc. may be used.

The e-mail/calendaring server 550 may be a third party e-mail/calendaring server, such as a Microsoft Exchange server. In one embodiment, the e-mail/calendaring server 550 processes the calendars and schedules for the employees of a facility, as well as for physical areas of the facility. For example, the e-mail/calendaring server 550 may processes scheduling for conference/meeting rooms, as well as certain technology such as projectors, video conference equipment, etc. In one embodiment, the e-mail/calendaring server 550 provides information such as schedules to the adaptive interaction manager 506. Further, the e-mail/calendaring server 550 may allow access to e-mails by one or more cloud-based application 518 such as the personal assistant applications described above. The personal assistant applications may be able to extract contextual information from the data provided by the e-mail/calendaring server 550 and provide the contextual information to the adaptive interaction manager 506 via an API 542.

The security system 552 may include multiple elements associated with a facility or building security system. For example, the security system 552 can include multiple devices such as cameras, microphones, motion detectors, thermal sensors, access devices (RFID locks, biometric locks, etc.), entry logs, etc. In one embodiment, the security system 552 provides data to the adaptive interaction manager 506. The data may include occupancy data provided by the motion detectors and/or thermal sensors. Further, the data may include video and/or digital images provided by the cameras. In one embodiment, the digital images may be provided to the cloud-based application 518 for processing via the adaptive interaction manager 506. For example, the cloud-based application 518 may be a gesture recognition application, such as Microsoft Kinect.

Figure 6:
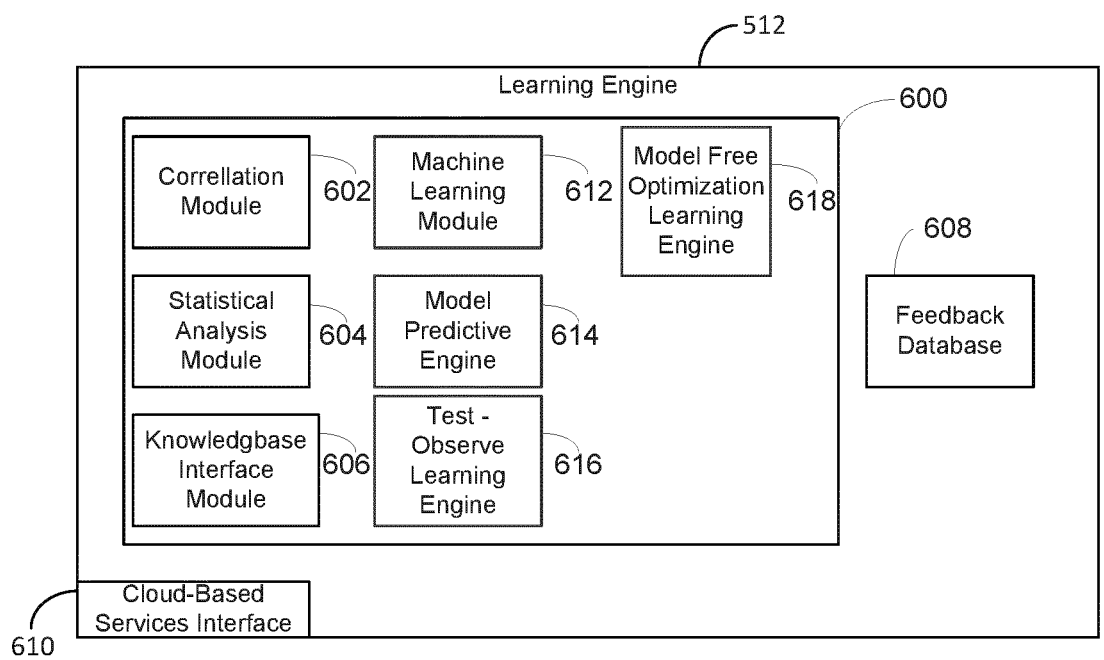
FIG. 6 is a block diagram showing a detailed view of the learning engine shown in FIG. 5, according to some embodiments.

Turning now to FIG. 6, a block diagram showing a detailed view of the learning engine 512 is shown, according to some embodiments. The learning engine may include a number of software modules 600. The software modules are shown to include a correlation module 602, a statistical analysis module 604, a knowledgebase interface module 606, a machine learning interface 612, a model predictive engine 614, a test-observe learning engine, and a model free optimization learning engine 618. The learning engine 512 may further include a feedback database 612 and a cloud-based services interface 614. The correlation module 602 may contain computer code executable by the processor 508 of the processing circuit 504 for correlating received data to generate correlated learning data. For example, the correlation module 602 may correlate an increase in temperature of a room at a certain time of day, with a request to lower the temperature in the room. The correlation module 602 may therefore generate correlated learning data that may anticipate the request to lower the temperature at the above time, and provide information to one or more agents (as discussed below), which will allow the agents to lower the temperature prior to the request to lower the temperature being provided to the BMS. The correlated learning data may be used by one or more agents associated with one or more BMS devices, controllers, or functions, as described above.

The statistical analysis module 604 may contain computer code executable by the processor 508 of the processing circuit 504 for providing statistical analysis of data received from the BMS. For example, the learning module may statistically analyze user actions, data trends, operating data, feedback data, etc., to generate statistical learning data. For example, the statistical analysis module 604 may analyze energy cost data over a period of time, and generate statistical learning data to anticipate when energy cost will be highest, which may be used to suggest energy conservation methods to a user via one or more agents. Further, where energy storage devices are present in the BMS, the statistical analysis module 604 may be used to predict when the best times for charging and discharging the energy storage devices may be, which may be pushed to one or more agents in the BMS.

The knowledgebase interface module 606 may provide access to the data stored in a knowledgebase, such as that stored in database 516, described above. This can allow the correlation module 602 and the statistical analysis module 604 to access data stored in one or more knowledgebases associated with the system 500 via the knowledgebase interface module 606. In some examples, the feedback database 612 may also be able to access one or more knowledgebases associated with the system 500. In some embodiments, one or more of the correlation module 602, the statistical analysis module 604, the machine learning module 612, the model predictive engine 614, the test-observe learning engine 616, and the model free optimization learning engine 618 may be able to write data to the one or more knowledgebases of the system 500 via the knowledgebase interface module 606. The cloud-based services interface 614 may allow the learning engine 512 to interface with one or more cloud applications, such as cloud-based application 518 of system 500.

The machine learning module 612 may provide a machine learning engine to perform machine learning based on data received from the BMS 500 and/or the database 516. In some embodiments, machine learning module 612 may receive data from multiple buildings (e.g., multiple BMSs) and learn from the data for various environmental conditions, equipment configurations, setpoint schedules, and/or the like. For example, the machine learning module 612 may build a model from an existing set of data and analyze subsequently received data to generate data driven predictions or decisions. In one embodiment, the machine learning module 612 may generate algorithms that can learn from the available data, and that are not required to follow generally static program instructions. In one embodiment, the machine learning module 612 may perform machine learning tasks using a supervised learning system. In other embodiment, the machine learning module 612 may perform machine learning tasks using an unsupervised learning system or a reinforcement learning system. Further, the machine learning module 612 may utilize learning to learn, or developmental learning operations. In one embodiment, the machine learning module 612 may utilize learning algorithms, including, but not limited to: decision tree learning algorithms, association rule learning algorithms, artificial neural networks algorithms, deep learning algorithms, inductive logic programming algorithms, support vector machines algorithms, clustering algorithms, Bayesian network algorithms, reinforcement learning algorithms, representation learning algorithms, similarity and metric learning algorithms, sparse dictionary learning algorithms, and/or genetic algorithms. In some embodiments, the machine learning module 612 may provide generated machine learning algorithms to one or more software agents to generate self-learning software (e.g., intelligent) agents.

For example, intelligent agents (e.g., space agents, control agents, and/or equipment agents) may be configured to have states and behaviors, as well as be configured to operate as a computation unit. In some embodiments, intelligent agents may be configured to sense their environments (e.g. the system or device for which they are installed), and evaluate potential operational options, as well as effect actions within the system or device. Intelligent agents may further be configured to function autonomously, and can further be goal oriented (e.g. can work towards achieving specific goals). The intelligent agents can further be configured to interact with other agents and can work in a co-operative manner with other said agents. Additionally, intelligent agents can further learn from their behavior and the effect of the behaviors on the environment over time based on machine learning. For example, the intelligent agents may be configured to perceive an environment with sensors or other inputs, and act on the perceived environment with effectors. The intelligent agents may further be configured to act upon perceived information, experiences, or own decisions. The methods of generating and/or configuring intelligent agents and other software agents will be described in more detail below.

In some embodiments, intelligent agents may transmit observation and action data to the machine learning module 612 corresponding to its own environment, sensors, or other inputs, as well as actions taken and results achieved in response to such perceived environment. In this case, the machine learning module 612 may analyze the received data with data received from other agents in the same or other buildings to generate machine learning algorithms that can be utilized by the other agents (e.g., intelligent agents). Taking reinforcement learning as an example, machine learning module 612 can provide machine learning algorithms to agents (e.g., intelligent agents) to take an action for any given state based on reinforcement learning. Reinforcement learning is a machine learning technique that determines a reward (e.g., points or a numerical value) for an action taken in any given state, where the goal is to take actions that result in higher rewards. In this case, the intelligent agents can aggregate the data received from machine learning module 612 with its own observations and actions to determine a next action for a given state.

Figures 7A, 7B:
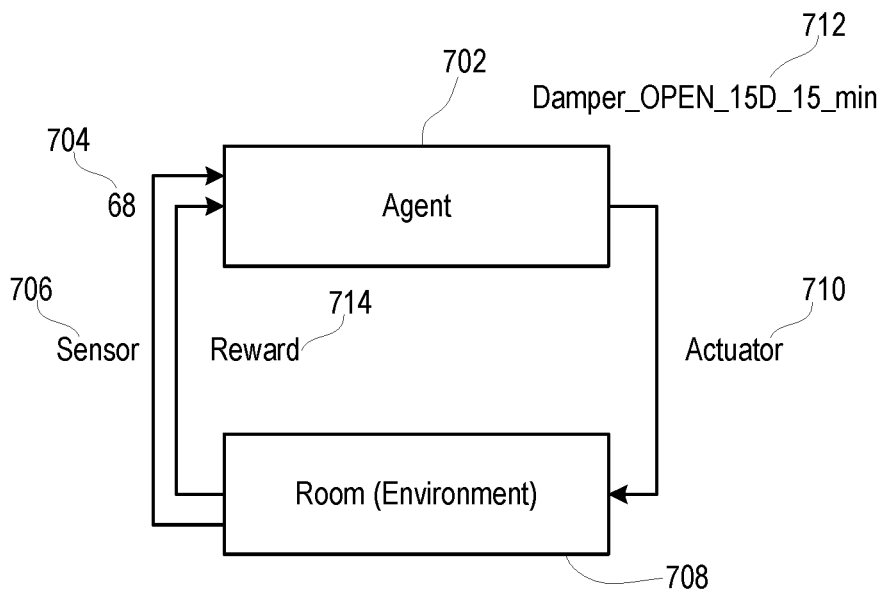
FIG. 7A is a block diagram of an agent for controlling the temperature of an environment, according to an exemplary embodiment.
FIG. 7B is a table illustrating results for an initial loop through the machine learning process of the agent in FIG. 7A, according to an exemplary embodiment.

For example, referring to FIG. 7A, a block diagram of an agent for controlling the temperature of an environment is shown, according to an exemplary embodiment. As shown in FIG. 7A, an agent (e.g., an intelligent agent) 702 receives sensor data 704 from a sensor (e.g., a temperature sensor) 706 located in an environment (in this case a room) 708. The agent 702 perceives a state of the environment 708 via the sensor 706, and acts on or affects the environment 708 via an effector (in this case an actuator) 710. In this example, the sensor 706 indicates that a current state of the environment 708 (in this case an initial state) is 68 degrees, as indicated by the sensor data 704. Based on the current state of the environment 708, the agent 702 can perform an action 712. For example, an initial action may be to open a damper by 15 degrees (15D) for 15 minutes in order to change the temperature to achieve a specific goal or result (e.g., 70 degrees in this example). After the action is performed, the agent 702 receives a reward 714 based on the result of the action 712. For example, referring to FIG. 7B, a table illustrating results for an initial loop through the machine learning process of the agent in FIG. 7A is shown, according to an exemplary embodiment. The table includes a state (Temp_Before) 716, an action (Damper_Position) 718 taken in response to the state, a result (Temp_After) 720 in response to the action 720, a number of observations (or loops) 722, and a probability 724 that the same action 718 will be selected as a next action for a same (or similar) state 716, which may be calculated based on a reward (e.g., points) corresponding to the state 716, action 718, and result 720.

Figures 8A, 8B:
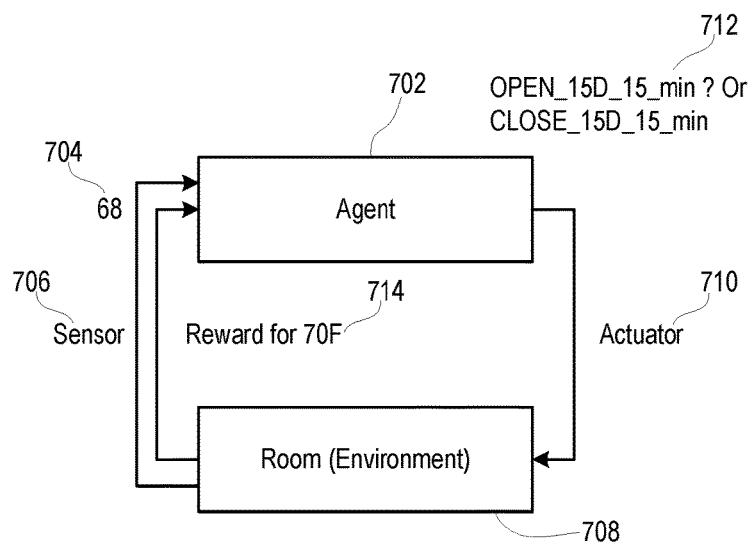
FIG. 8A is a table illustrating results for a plurality of loops through the machine learning process of the agent in FIG. 7A, according to an exemplary embodiment.
FIG. 8B is a block diagram of an agent for selecting a next action to control the temperature of an environment, according to an exemplary embodiment.

FIG. 8A is a table illustrating results for a plurality of loops through the machine learning process of the agent in FIG. 7A, and FIG. 8B is a block diagram of an agent for selecting a next action to control the temperature of an environment, according to an exemplary embodiment. As shown in FIG. 8A, as more actions are taken over time, the table is continuously updated for each opportunity 802 to calculate a probability 724 for selecting a next action from among the actions 718 based on the state 716, actions (e.g., previous actions) 718, and results 720. For example, referring to FIGS. 8A and 8B, for a current state 704 of 68 degrees, the agent 702 can take one of two actions 712 with the goal of increasing the temperature to 70 degrees. The two actions 712 include opening the damper by 15 degrees (15D) for 15 minutes or closing the damper by 15 degrees for 15 minutes. From the table shown in FIG. 8A, either of these actions can result in the temperature of 70 degrees, as represented by the rows 804 and 806. However, there is a 51.4% probability that opening the damper by 15 degrees for 15 minutes is more likely to result in the desired 70 degree temperature, whereas there is only a 11% probability that closing the damper by 15 degrees for 15 minutes will result in the desired 70 degree temperature. In this example, the agent 702 will choose to open the damper by 15 degrees for 15 minutes based on the probability 724 (or reward), and will observe the results thereafter to update the table. However, it should be appreciated that the examples described with reference to FIGS. 7A through 8B are non-limiting examples, and in other embodiments, there may be different or more variables for states and different or more types of actions depending on the application. For example, adding more variables to the state (e.g., outdoor temperature) may exponentially increase the problem space, but polynomial.

While FIGS. 7A through 8B show a non-limiting example of controlling the temperature of a particular room, the present disclosure is not limited thereto, and it should be appreciated that various embodiments of the present disclosure may be applied to any aspect of simulating, controlling, and/or monitoring environmental conditions, equipment, or devices of a building, such as humidity, particulate count, occupancy time (actual and/or expected), lighting, audio/visual, fire safety, electrical, security, access control, lifts/escalators, and/or the like, for example.

Referring again to FIG. 6, the model predictive engine 614 may generate model predictive control algorithms to be used by the controller 502. In one embodiment, the model predictive engine 614 may generate model predictive control algorithms based on internal dynamic models of the system, a history or past control moves, and an optimization cost function to calculate the optimum control moves. In one embodiment, the model predictive control algorithms may be nonlinear model predictive control algorithms. In other embodiments, the model predictive control algorithms may be robust model predictive control algorithms. The model predictive engine 614 may generate the predictive control algorithms and process data received by the controller 502. The model predictive engine 614 may then output the generated algorithms to one or more software agents. In other embodiments, the model predictive engine 614 may generate the model predictive control algorithms and subsequently output the algorithms to one or more software agents in the system 500. The methods of generating and/or configuring software agents will be described in more detail below.

The test-observe learning engine 616 may generate testing algorithms based on performing a given test and observing the results. For example, the test-observe learning engine 616 can vary multiple setpoints within system 500, and monitor the outputs to determine reactions of the system 500. In some embodiments, the reactions may be based on outputs of the system 500. In other embodiments, the reactions may be based on user feedback. For example, the user may respond that they did not like the outputs from a particular test generated by the test-observe learning engine 616, which may then store the user feedback as a result and modify future tests accordingly. In some embodiments, the test-observe learning engine 616 may generate one or more software agents to perform and monitor the tests. In some embodiments, the test-observe learning engine 616 may utilize existing software agents to perform and monitor the tests. In one embodiment, the test-observe learning engine 616 may utilize one software agent to perform a given test, and utilize a second software to monitor the test. The methods of generating and/or configuring software agents will be described in more detail below.

The model free optimization learning engine 618 may generate one or more optimization models based on historical time series and/or real-time data of the system 500. The model free optimization learning engine 618 may utilize one or more model free methods to generate the optimization models. Example model free methods can include: generate-and-test, enumeration, table lookup, mindless copying, adaptation, and/or evolution. These method-free methods may allow the model free optimization learning engine 618 generate one or more optimization models without understanding the system 500 prior to being tasked with optimizing the system 500. In one embodiment, the model free optimization learning engine 618 may provide the one or more optimization models to one or more software agents within the system 500. In other embodiments, the model free optimization learning engine 618 may generate one or more software agents to execute the optimization models. In other embodiments, the model free optimization learning engine 618 may generate or utilize one or more software engines within the system 500 to execute one or more model free methods to develop an optimization model. The methods of generating and/or configuring software agents will be described in more detail below.

Figure 9:
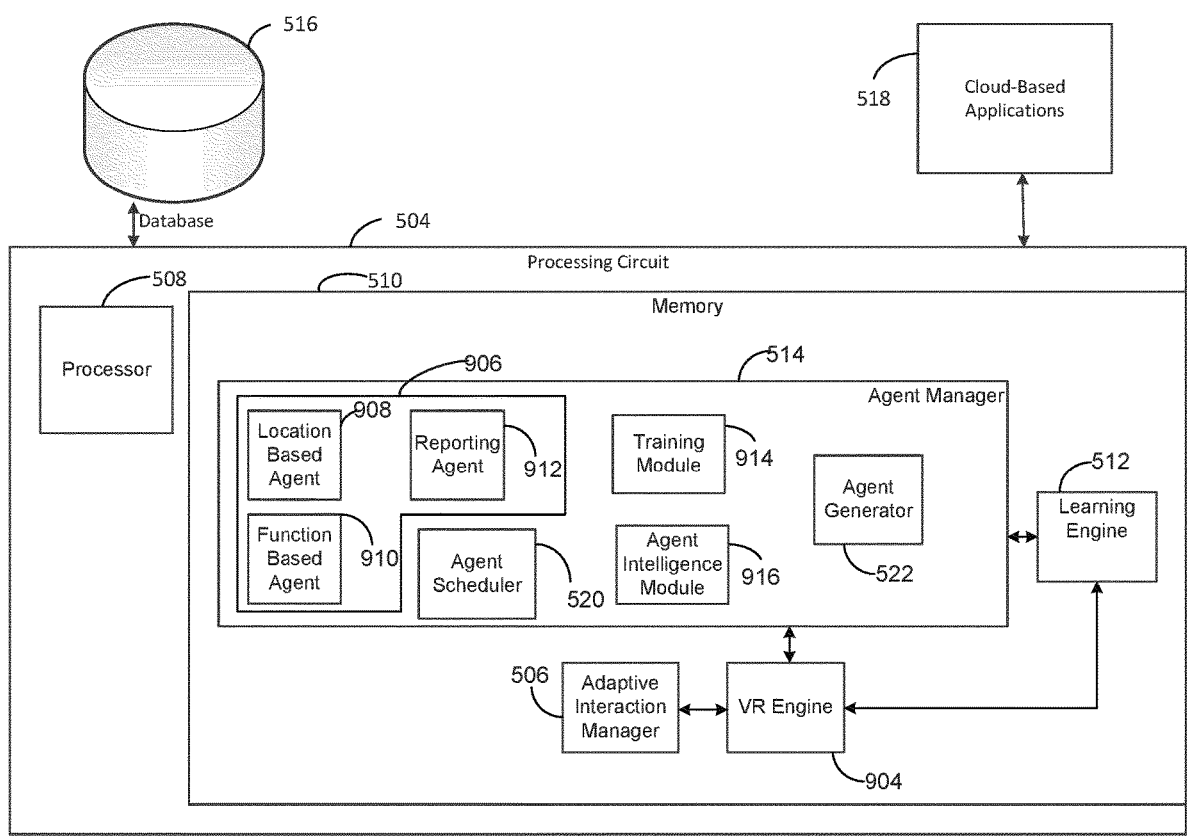
FIG. 9 is a block diagram schematic of the processing circuit of the controller shown in FIG. 5, according to an exemplary embodiment.

Referring now to FIG. 9 a block diagram schematic of the processing circuit 504 of the controller 502 is shown, according to one embodiment. As described above, the processing circuit may be in communication with the database 516, and one or more cloud-based applications 518. The database 516 may include data relating to one or more BMS's, such as building layouts, system schematics, device information, control schemes, environmental ratings, historical data, etc. In one embodiment, the database 516 includes contextual information accessible by the processing circuit. The contextual information may include dictionaries, historical data, scripts, and/or other data for interpreting contextual information. The one or more cloud-based applications 518 may be those described above. The one or more cloud-based applications 518 may further be able to communicate with the processing circuit 504 to provide data to or from other applications. In some embodiments, the processing circuit 504 may access the one or more cloud-based applications 518 directly. In other embodiments, the processing circuit 504 may access the one or more cloud-based applications 518 via the adaptive interaction manager 506.

The processing circuit 504 is shown to include the processor 508 and the memory 510, as described above. In one embodiment, the memory 510 includes the agent manager 514, the learning engine 512, the adaptive interaction manager 506, and a VR engine 904. In one embodiment, the VR engine 904 is used to process the information processed by the learning engine 512, the agent manager 514 and/or the cloud-based applications 518. For example, the VR engine 904 may be used to process voice-to-text information provided by the cloud-based applications 518. Further, the VR engine 904 may have the ability to communicate with one or more BMS devices or systems to read and/or write parameters via the BMS interface 528, as described above. Further, the VR engine 904 may be a virtual assistant engine which can process information provided via the applications. In some examples, the VR engine 904 may be a third party VR engine, such as Apple's Siri, Microsoft's Cortana, or Amazon's Alexa. The third party VR engines may be stored locally in the memory 510, or accessed via an internet connection. In some embodiment, the VR engine 904 processes information received from the adaptive interaction manager 506, via the adaptive interaction manager interface 530.

The memory 510 may further include the agent manager 514. While the agent manager 514 is shown to be within the memory 510, it is contemplated that the agent manager 514 may be a cloud-based agent manager 514 accessible by the processing circuit 504 or the adaptive interaction manager 506. In one embodiment, the agent manager 514 generates and manages one or more agents 906 using the agent generator 522, as will be described in more detail below. The agents 906 may be software applications that can run automated tasks (scripts). The agent generator 522 may generate the agents 906 based on information provided by the adaptive interaction manager 506. In one embodiment, the agents 906 generated by the agent generator 522 may be configured to perform simple or complex tasks within a BMS or other system. For example, the agents 906 may interact with portions of a BMS system, such as those described in FIGS. 1-4 above. In some examples, the generated agents 906 may be communicated directly to one or more devices within the BMS to perform the designated actions, as described in more detail below.

In one embodiment, a user defines the agents 906 to be generated by the agent generator 522 during an initial setup period of the controller 502. Alternatively, a user may dynamically define one or more agents 906 to be generated by the agent generator 522. The user may define the agents 906 by defining parameters and permissions associated with the agents 906, via one or more I/O devices 534. For example, where the agent 906 is to interact with a BMS device, a user may define information related to the BMS to the agents 906, such as parameters associated with one or more BMS devices, BMS device data, network data, general BMS data (building layout, control scheme, BMS equipment), schedules, etc. Alternatively, other information such as facility calendars, e-mail access (maintenance accounts, authorized personnel accounts, etc.) may also be set for an agent. Further, permissions such as controllable set-points, ranges within which the agent can modify certain parameters, scheduling changes, etc., may also be defined with the agents 906. The permissions may be based on the user defining the agents 906. Alternatively, the user, with the proper permission, may set the permissions for other users who may interface with the agents 906.

In one embodiment, the user can define the agents 906 via the one or more I/O devices 534, as described above. Alternatively, the user may be able to define the agents using a voice or gesture command. In one embodiment, the agent manager 514 is able to dynamically define and generate agents 906 based on commands or requests received from a user. For example, the agent manager 514 may access the learning engine 512 to dynamically define and generate agents 906, which will be discussed in more detail below. The agent manager 514 may further be able to generate agents based on contextual data received from a user, such as that described above. For example, where a user states that "it is hot in here," an agent 906 may be generated by the agent manager 514 to determine the temperature at the location of the user, and potentially interface with the user to reduce a temperature of an area of a facility. Further, permissions may be dynamically created by the agent manager 514. For example, the agent manager 514, receiving a request to set up an agent 906 from a user, may identify the user and then access the database 516 (or other connected database) to determine the permission levels associated with that user. Additionally, permissions may be based on certain locations or areas within a facility. The permissions may determine which parameters are available for the generated agent 906 to read and/or write.

In one embodiment, the agent manager 514 may generate a location based agent 908. The location based agent 908 may have defined parameters and permissions associated with a given location with a BMS and/or facility. For example, the executive suite may require additional permissions than a normal conference room. In one embodiment, the location is based on the location of the user defining the agent 908 (e.g. "lower the temperature in this room"); however, the location may also be based on the location of the system or device that the user is attempting to monitor/control (e.g. "lower the temperature in room XYZ"). In one embodiment, the location is established by determining a location of a fixed position user interface, such as I/O devices 534 described in FIG. 5, above. For example, where the I/O device 534 is a smart thermostat, the agent manager 514 may access the database 702 to determine a location associated with the user interface. In other examples, the I/O device 534 may provide its location to the agent manager 514 directly when communicating with the adaptive interaction manager 506. In other examples, the I/O device 534 may not have a fixed location, such as where the I/O device 534 is located on a mobile device. In one embodiment, the I/O device 534 provides location information regarding the location of the I/O device 534 to the adaptive interaction manager 506. For example, the I/O device 534 may provide GPS data, altimeter data, Wi-Fi data, etc. to the adaptive interaction manager. In one embodiment, the agent manager 514 compares the location data with building and/or facility layout data in the database 516 to determine a location of the I/O device 534 in relation to a BMS and/or building/facility.

In a further embodiment, the agent manager 514 may generate a function-based agent 910. The function based agent 910 may have defined parameters and permissions associated with a given function or series of functions associated with a BMS. For example, the agent manager 514 may generate a functional-based agent 910 such as an "energy management agent." The energy management agent may be defined to monitor and/or evaluate energy related data associated with a BMS. For example, the energy management agent may monitor and evaluate energy related data such as kWh, peak demand, etc. Other functional-based agents 910 may include chiller management agents, HVAC management agents, lighting management agents, etc. In some embodiments, the function based agents 910 are configured by the agent manager 514 to generate context specific reports for related functions. In some examples, the function-based agents 910 may evaluate the user, type of available data, location, etc. and generate dynamic reports. In other examples, the user can define what parameters/data is requested in the reports. In still further examples, a user may be able to modify the dynamically generated reports over time by indicating which data is and is not required and/or desired by the user. Further, the user can provide feedback to the function-based agent 910 to provide additional guidance related to the frequency with which the reports should be generated (i.e. daily, weekly, monthly, etc.). While the function-based agent 910 or the location based agent 908 may generate reports, a report generating agent 912 may also be generated to produce reports. In one embodiment, the report generating agent 912 may be able to generate reports across multiple locations and/or functions.

In some embodiments, the agent manger 514 may generate equipment agents for various building equipment (e.g., BMS devices) such as those described with reference to FIGS. 1-4. Each equipment agent may be associated with a specific device within the BMS, such that equipment agent for the specific device is a digital twin or shadow of the specific device. For example, a VAV may have an associated VAV agent, a sensor may have an associated sensor agent, an AHU may have an associated AHU agent, a chiller may have an associated chiller agent, an RTU may have an associated RTU agent, and/or the like. Thus, an associated equipment agent is a software representation of the associated equipment, and may have the same states and controls of the associated equipment. For example, a corresponding equipment agent may have access to the same inputs and outputs as those of the associated equipment. Further, the corresponding equipment agent may be able to control and/or monitor various parameters of the associated equipment. However, in some embodiments, an equipment agent is not limited to representing a single device or equipment, for example, an equipment agent may represent a logical group of devices or equipment (e.g., all AHU's, all VAV's, all temperature sensors, all thermostats, or the like).

In some embodiments, the agent manager 514 may generate space agents for various spaces (e.g., building, floor, room, zone, and/or the like) of a corresponding building. However, in some embodiments, a space agent is not limited to representing a single space (e.g., building, floor, room, zone, and/or the like), for example, a space agent may represent a logical group of spaces (e.g., all meeting rooms on floor 5, all restrooms in the building, or the like). In some embodiments, each space has its own programmable optimization state (e.g., optimized for comfort, optimized for cost, or the like), and the space agent for each space represents the programmable optimization state for the space. In some embodiments, the space agent may monitor and control an environmental condition of the associated space based on the programmable optimization state for the space. For example, in some embodiments, space agents own the temperature setpoint for their respective space, and can calculate the effective temperature setpoint for their respective space based on the optimization state of the space. However, the present disclosure is not limited thereto, and it should be appreciated that space agents may be used to control and/or monitor other environmental conditions of their particular space, such as humidity, particulate count, occupancy time (actual and/or expected), lighting, audio/visual, fire safety, electrical, security, access control, and/or the like, for example.

In some embodiments, space agents may monitor the conditions and parameters of the space, as well as the health of the various equipment that serve the space. For example, the space agent may monitor the current temperature, humidity level, size, location, number of windows, number of occupants, occupancy patterns, and/or the like of the space. Further, the space agent may monitor the health or status of sensors, lighting devices, blinds or shades, VAV units, AHU, and/or other building equipment that serve the space. In some embodiments, the space agent may be a parent of all of the agents associated with the space. In some embodiments, space agents may have a hierarchal order such that a space agent of a higher order may override controls of each of the space agents (and/or other agents) of a lower order. For example, a building agent may be the parent of all of the floor agents in the building, each of the floor agents may be a parent of all of the room agents associated with a particular floor, each of the room agents may be a parent of all equipment agents that serve a particular room, and/or the like. In some embodiments, the parent agents may communicate with each of the corresponding child agents by exchanging messages via channels that the parent agents and/or child agents are subscribed to, as will be described in more detail below.

In some embodiments, the agent manager 514 may generate control agents. Control agents may be similar to function-based agents, but are configured to provide commands or logic to the other agents to optimize or override various control functions. For example, in some embodiments, control agents include optimization algorithms that are used by the space agents to optimize a space for a given optimization state. In some embodiments, the control agents communicate with the space agents to optimize or override controls of the equipment serving the particular space, and the space agents communicate with the equipment agents to provide controls to the equipment agents for controlling the equipment serving the particular space. Accordingly, each of the space agents and equipment agents are informed of the optimization or override commands, without the control agents having to determine the equipment and corresponding equipment agents that service a particular space. However, the present disclosure is not limited thereto, and in other embodiments, the control agents can communicate with the space agents and the equipment agents concurrently (or simultaneously) via a corresponding channel, which can reduce latencies in the communication chain. In some embodiments, control agents can include, for example, global data sharing agents, temporary occupancy override agents, scheduled exception agents, flow setpoint reset agents, optimal start/stop agents, reheat valve control agents, unoccupied mode night setback agents, chiller sequencing agents, and the like.

Figure 10:
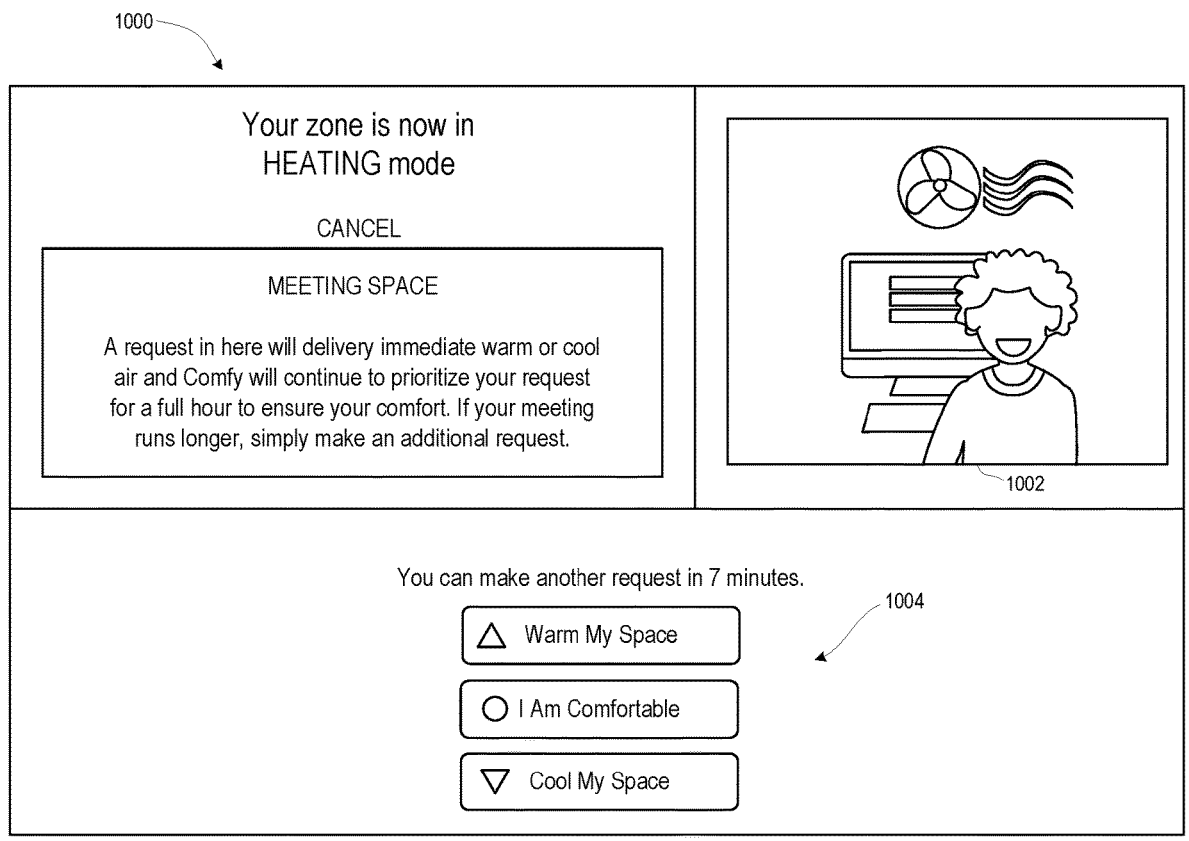
FIG. 10 is a temporary occupancy override agent, according to one exemplary embodiment.

In a non-limiting example, referring to FIG. 10, a temporary occupancy override agent is shown, according to one exemplary embodiment. The temporary override agent 1002 (who is named Comfy in this example) may provide an interactive interface 1000 to a user to temporarily override a pre-set environmental condition in a space (e.g., a room). While FIG. 10 shows that the interactive interface 1000 is presented to the user on a display device, the present disclosure is not limited thereto, and in other embodiments, the interactive interface may be a voice recognition interface such as those discussed above with reference to FIG. 5. In the example shown in FIG. 10, the space is a meeting room. Generally, a space agent associated with the meeting room may modify the environmental setpoints within the meeting room based on multiple factors, including a schedule of events within the room. The space agent may lower (or increase) the temperature of the meeting room prior to, and during a scheduled meeting. Once the meeting is scheduled to conclude, the space agent may adjust the environmental parameters to conserve energy. The temporary occupancy override agent 1002 may allow users to indicate that they are still occupying the meetings space (e.g. if a meeting goes long), and in response, the temporary occupancy override agent 1002 may override the space agent's settings to ensure that the temperature of the meeting room remains at a comfortable setting. In other embodiments, the temporary occupancy override agent 1002 (or the space agent for the meeting room, as another example) may be able to detect occupancy in a space (e.g., via an occupancy sensor), and can adjust the environmental setpoints accordingly, regardless of an occupancy schedule of the space.

In some examples, the temporary occupancy override agent 1002 may receive an indication from an occupant that they would like the environmental setpoints to be modified to make the occupant(s) more comfortable. For example, the temporary occupancy override agent 1002 may provide a command interface 1004 on the interactive interface 1000, or receive a natural language voice command via a voice recognition interface. In this case, if the occupants prefer a temperature other than the normal settings, or if the meeting room remains occupied outside of a scheduled time, the temporary occupancy override agent 1002 may allow the occupants to make temporary changes to the environmental setpoints. For example, the temporary occupancy override agent 1002 may only allow the occupants to modify the environmental setpoints after a set time has lapsed, such as seven minutes, but other time periods are contemplated. In some embodiments, the occupants can specify for how long the environmental setpoints should be modified. Restricting the time period for which the occupant can modify the environmental setpoints ensures that energy is not wasted, which may occur when the occupants are only in the meeting space for a short, unscheduled period. In some embodiments, the temporary occupancy override agent 1002 may only allow the user that has scheduled the meeting to modify the environmental setpoints. In other embodiments, the temporary occupancy override agent 1002 may allow each of the expected attendees (e.g., as determined via the meeting invite) to modify the environmental setpoints. However, the present disclosure is not limited thereto, for example, in other embodiments, the temporary occupancy override agent 1002 may allow any occupant within the meeting room to modify the environmental setpoints.

While the temporary override agent shown in FIG. 10 is shown to override a temperature of the meeting room, the present disclosure is not limited thereto, and it should be appreciated that control agents may be used to optimize and/or override any suitable environmental conditions, equipment, or devices of a building, such as humidity, particulate count, occupancy time (actual and/or expected), lighting, audio/visual, fire safety, electrical, security, access control, lifts/escalators, and/or the like, for example.

The above described agents are exemplary only, and it is contemplated that other agent types may be generated to provide any functionality within the capability of the system 500. Further, it should be known that one or more of the location based agent 908, the function based agent 910, the reporting agent 912, the equipment agent, the space agent, and/or the control agent may be combined into a single agent generated by the agent generator 522. For example, a BMS-need agent may be generated. The BMS need agent may be an autonomous agent that can evaluate current needs of the BMS 525, and perform tasks independently to address the needs. Further, a BMS sequence optimizer agent may be generated. The BMS sequence optimizer agent may be utilized to evaluate the sequence of operations within the BMS 525. The BMS sequence optimizer agent may then perform optimization functions to the sequences of the BMS 525 to increase the operating efficiency of the BMS 525.

In various embodiments, the agents described above can generally communicate with each other, and with the BMS in general, using messages. Messages may be serialized pieces of data that are published to a channel. The channel may allow the messages to be sent to all agents that are subscribed to the channel. In one embodiment, each message may contain a unique identifier and the identifier of the agent that published the message. An agent can publish (e.g. send) a message to a channel or subscribe (receive) a message from a channel. A message that is published to a channel is received by all subscribers to that channel. A channel may contain any group of agents that need to communicate with each other. In some embodiments, channels are the medium used by the agents to send and receive messages, and passing messages may be the only method of providing communication to and from agents. Further, the messaging infrastructure and the agents may be separate from each other. For example, the agents may be configured to not know their location, other agents in the group, or any other details of the messaging infrastructure. Likewise, the messaging infrastructure may not know anything about the agents other than which agent to send messages to. The generation and configuration of channels will be described in more detail with reference to FIGS. 11 through 13 below.

Referring again to FIG. 9, the agent manager 514 may further include a training module 914, and an agent intelligence module 916. The training module 914 is an exemplary module that may be within the agent manager 514. The training module 914 can be used to train one or more of the agents generated by the agent manager 514. The training module 914 may define boundaries and expectations associated with agents generated by the agent generator 522. While the training module 914 is shown as a standalone module in the agent manager 514, the training module 914 may be incorporated into one or more generated agents. In one example, the training module 914 may define what parameters for a given BMS device may or may not be adjusted. The training module 914 may also define value ranges within which parameters associated with BMS devices may be adjusted. In other examples, the training module 914 may train the agents by defining other conditions required to modify or access certain parameters. For example, parameters associated with certain BMS devices may only be accessible during certain times, by certain users, etc. In one embodiment, the training module 914 may be in communication with the database 516 to access information about the BMS and associated devices, such as schedules, permissions, rules, connected systems, etc.

In some embodiments, the adaptive interaction manager 506 can provide information to the training module 914 to further train the agents generated by the agent manager 514. For example, user data may be presented to the adaptive interaction manager 506 via the I/O devices 534 indicating when the user would like certain functions to be performed by one or more of the generated agents. This information can be processed by the adaptive interaction manager 506 and passed to the training module 914 via the processing circuit 504. For example, the user may want reports generated at a certain time each day, and that the reports contain information gathered over a user defined time period. Further, the user may define what information is desired to be in the report. In other examples, user data may instruct the training module 914 to "train" the agents to perform certain tasks such as optimization of energy usage during certain times or in certain locations.

The training module 914 may further allow for user specified outcomes and objectives to be used to further train generated agents 906. By allowing for user specified outcomes and objectives to be used, the agents can constantly evolve to provide more accurate feedback. Examples of user specified outcomes and objectives training can include feedback after mistakes or incorrect outputs are generated by an agent 906. In one example, an agent 906 may suggest and perform a particular function, and subsequently provide a report to a user indicating the outcome associated with the performed action. The user then may be asked if the agent 906 should continue to perform the particular function in the future. This information may be stored in the agent 906, as well as the training module 722. This can allow the training module 722, and the agent manager 514 in general, to learn what is likely to be acceptable by the user. Further, this information can be provided to the learning engine 512, which may process the feedback to help learn from previously generated agents. For example, a function-based agent 910, such as an energy management agent, may suggest running chillers in parallel to decrease the time to regulate temperature in a portion of a facility when there are sudden temperature swings (e.g. when a large group of people enter a room to attend a meeting). However, if the cost is too high to run parallel chillers, a user may instruct the agent 910 to stop running the chillers in parallel. This information is gathered by the training module 914 and provided to the learning engine, which may update a knowledgebase. In some embodiments, the training module 722 may store the information in the database 516. Over time, the training module 722 may collect enough information to learn what are acceptable costs for certain gained efficiencies and can instruct the agent 906 to perform its tasks accordingly. In still further examples, the training module 914 may include cost restrictions associated with agent functions. For example, some actions may not be allowed where it is determined that the associated cost would exceed a given value. In other examples, the cost restrictions may be associated with the user presenting the request. In that instance, a supervisor, or person with authority to approve the cost may be contacted, and allowed to approve/disapprove the change. For example, a text message could be generated and transmitted to a mobile device associated with the authorized person who can reply to the text message to approve or deny the cost, via the adaptive interaction manager 506. Other communication methods such as e-mail, push notifications, etc., are further contemplated.

In other examples, a user may be presented with a list of possible actions that an agent can perform in certain situations, allowing a user to select which particular action should be performed. In one embodiment, the possible actions are presented to the user via a user interface, such as those described above. Further, the training module 914 may store the user selections (e.g. in the database 516) and learn over time how a user generally proceeds, and take the actions without consulting the user in each occurrence.

In a further embodiment, the training module 914 may provide an agent 906 with new rules via the agent manager 514. For example, a user 538 may be presented with a question of "would you like an alert if this (a given situation) happens again" via an I/O device 534. If the user responds in the affirmative, the training module 914 may create a rule within the associated agent 906 to generate an alert to be provided to the user 538 when the condition occurs in the future. Further, the user may be prompted if they "would like a monthly report showing data for Unit X?" Again, if the user responds in the affirmative, the training module 914 may create a rule within the associated agent 96 to generate a monthly report showing data for unit X. Alternatively, the training module 914 may instruct the agent generator 522 to generate a reporting agent associated with unit X, and provide parameters around what should be included in the report. Further, the above alert rules and reports may be modified over time as more information becomes available. For example, more rules may be added, such as providing for alerts regarding changes to preventative maintenance (PM) schedules, and/or assignments of maintenance persons.

The agent manager 514 may further include an agent intelligence module 916. The agent intelligence module 916 may evaluate a request by a user 538 to attempt to provide intelligence around the generated agent 906. For example, the agent intelligence module 916 may determine what the user's 538 purpose is in generating the request. For example, the agent intelligence module 916 may analyze if the purpose is to generate a report, optimize a system, perform simple or complex controls, etc. This may be used by the agent generator 522 in determining what parameters, attributes, etc., should be placed on a generated agent. Further, the agent intelligence module 916 may determine what a user 538 wants. For example, does the user 538 want a basic or isolated data point, or does the user 538 want data to be provided over time. Further, the agent intelligence module 916 may determine what reports, sequences, or other data the user cares about. In some instances, the agent intelligence module 916 may access the database or the learning engine 512 to see what a particular user has requested in the past. Further, the agent intelligence module 916 may access the database 516 to determine what types of data, reports, etc. a user has requested or accessed over time. This information can be provided to the agent generator 522 to help customize agents to be a particular user's 538 specifications.

Agent Messaging Infrastructure

As briefly discussed above, the various agents described herein are used to simulate a building or system, and communicate with each other by publishing messages via one or more communication channels. The use of agents and agent-based communication can provide multiple advantages over current BMS systems. Agent-based communication systems described herein can facilitate speed and efficiency improvements over other systems. For example, communication channels can be automatically created in response to a set of conditions, and may be dynamically modified according to changing events or conditions. In some embodiments, the conditions may be defined by the agents, for example according to building management system controls, occupancy within spaces, and the like. By registering an agent to a particular space within a defined building space hierarchy, messages can be automatically communicated upstream to parent agents (e.g., parent spaces) and/or downstream to child agents (e.g., child spaces, equipment, and/or the like). Furthermore, ad hoc generation of communication channels enables communication to be dynamically managed for a particular purpose. Accordingly, for example, messages that are sent, received, archived, and/or retrieved over a communication channel can be limited to the purpose (e.g., by limiting the devices that may publish messages, or the types of messages from each device) and dynamically modified. The communication channel may in effect perform similar to a "filtered" channel, simplifying analysis of published information, requiring less data to be searched by subscribers to the communication channel (e.g., a building controller), and fewer computer processor cycles.

Figure 11:
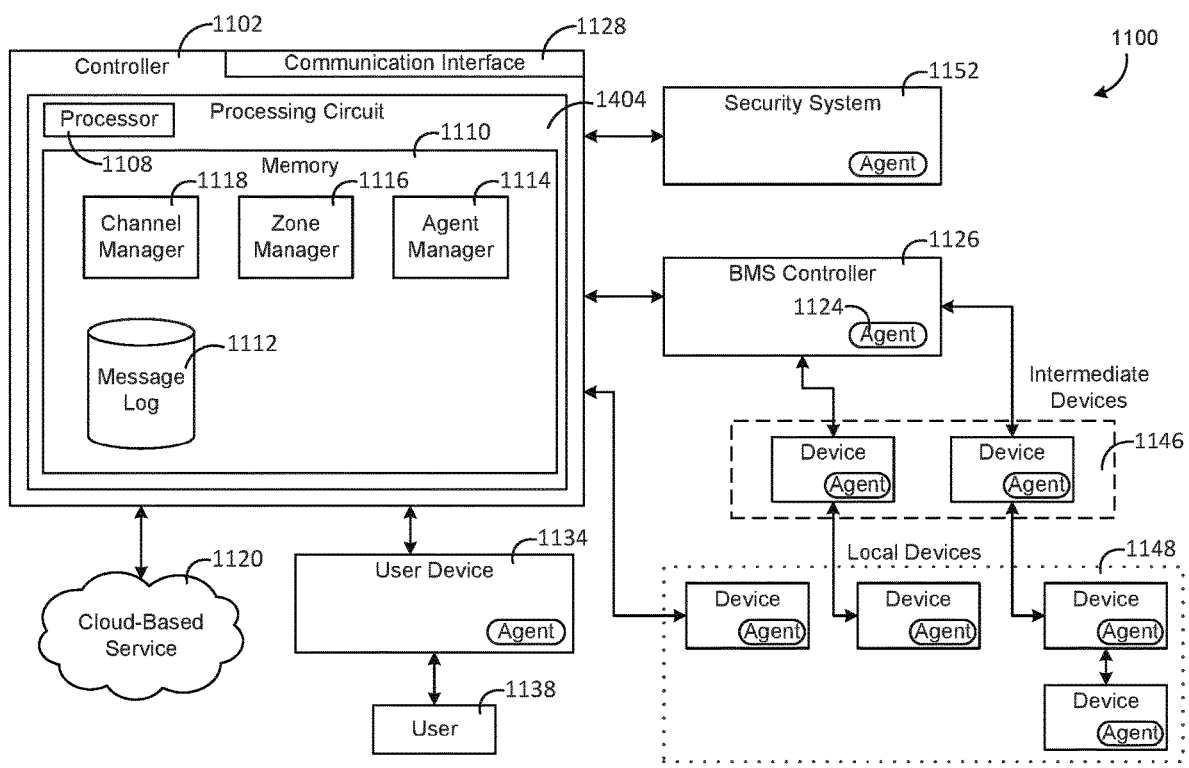
FIG. 11 is a block diagram of an agent-based communication system, according to some embodiments.

Turning now to FIG. 11, a block diagram of an agent-based communication system 1100 is shown, according to one embodiment. The system 1100 may be any of the BMS systems described above. In some embodiments, the system 1100 may be a part of the adaptive agent based control system as described with reference to FIG. 5, or may be separate from the adaptive agent based control system. Further, the system 1100 may be a peer-to-peer (P2P) network, such as a Verisys system from Johnson Controls. The system 1100 may include a controller 1102. The controller 1102 may be a dedicated controller within a BMS. In one embodiment, the controller 1102 is a cloud-based server (i.e. an internet-based server). For example, the controller 1102 may be physically located in one or more server farms and accessible via an internet connection. In some examples, the controller 1102 may be a standalone device in a peer-to-peer (P2P) network, such as a Verisys system from Johnson Controls. The controller 1102 may include a processing circuit 1104. The processing circuit 1104 may include a processor 1108 and a memory 1110. The processor 1108 may be a general purpose or specific purpose processor, an application specific integrated circuit (ASIC), one or more field programmable gate arrays (FPGAs), a group of processing components, or other suitable processing components. The processor 1108 is configured to execute computer code or instructions stored in the memory 1110 or received from other computer readable media (e.g., CDROM, network storage, a remote server, etc.).

The memory 1110 may include one or more devices (e.g., memory units, memory devices, storage devices, etc.) for storing data and/or computer code for completing and/or facilitating the various processes described in the present disclosure. The memory 1110 may include random access memory (RAM), read-only memory (ROM), hard drive storage, temporary storage, non-volatile memory, flash memory, optical memory, or any other suitable memory for storing software objects and/or computer instructions. The memory 1110 may include database components, object code components, script components, or any other type of information structure for supporting the various activities and information structures described in the present disclosure. The memory 1110 may be communicably connected to the processor 1108 via the processing circuit 1104 and may include computer code for executing (e.g., by the processor 1408) one or more processes described herein. When the processor 1108 executes instructions stored in the memory 1110, the processor 1108 generally configures the processing circuit 1104 to complete such activities.

The memory 1110 is shown to include a channel manager 1118, a zone manager 1116, an agent manager 1114, and a message log database 1112. Although the channel manager 1118, the zone manager 1116, the agent manager 1114, and the message log database 1112 are shown in the memory 1110, in other embodiments one or more are provided separately from the memory 1110, such as within the BMS controller 1126, the security system 1152, or the cloud-based service 1120.

In some embodiments, the agent manager 1114 may be similar to or the same as the agent manager 514 described with reference to FIG. 5. For example, in some embodiments, the agent manager 1114 maintains a record of all agents previously generated and active within the system 1100. Further the agent manager 1114 may also maintain real time data relating to which agents are currently active, and which agents are not currently active. The agent manager 1114 may further maintain real time data relating to which device within the system 1100 a particular agent is currently associated with. Further, the agent manager 1114 may generate a number of agents, such as agent 1124 (or any of the types of agents discussed above), for use in the system 1100.

In some embodiments, the agent manager 1114 may communicate the generated agents to the BMS via a communication interface 1128. The communication interface 1128 may be one or more wireless or wired interfaces. In some embodiments, the communication interface 1128 may include a wireless interface such as cellular (3G, 4G, LTE, CDMA, etc.), Wi-Fi, ZigBee, Bluetooth, RF, LoRa, etc. Additionally, the communication interface 1128 may include wired interfaces such as USB, Firewire, Lightning Connectors, CAT5 (wired internet), UART, serial (RS-232, RS-485), etc. In some embodiments, the communication interface 1128 may include a network connection, such as a BACnet network connection.

In some embodiments, the zone manager 1116 is configured to define a space within one or more buildings or zones. In some embodiments, the zone manager 1116 can be configured to define a building space hierarchy that maps each room or portioned space within each floor within a building. In this regard, the zone manager 1116 can be configured to map or define each BMS device within the building zone hierarchy, for example by mapping the BMS device to a building space (e.g., a room of a building floor).

In some embodiments, the zone manager 1116 is configured to define a building control zone. The building control zone can be associated with a control circuit that regulates operations of a BMS device in response to an input, such as data point values of a building sensor. In this regard and as described herein, the channel manager 1118 can be configured to generate a communication channel for the building control zone and register agents associated with spaces and/or BMS devices to the generated communication channel.

In some embodiments, the zone manager 1116 is configured to define a physical location zone and/or a geolocation zone. The physical location zone and/or the geolocation zone can relate to a physical location of a person or a building device, such as a GPS position or a location within a building. In some embodiments, the physical location zone generally corresponds to a static location and the geolocation zone generally corresponds to moving location. In some embodiments, a physical location of a person can be determined based on any method disclosed herein, such as location information received from a computing device (e.g., the user device 1134) associated with a person. The zone manager 1116 can be configured to generate a geolocation zone that follows the computing device. Any size or type of physical location zone and geolocation zone can be used. For example, a geolocation zone can correspond to a circular area having a one-mile diameter with the computing device at the center. In some embodiments, the physical location zone and/or geolocation zone size can vary based on an input condition. For example, the zone manager 1116 can be configured to increase the size of the geolocation zone when a distance of the computing device relative to a location exceeds a particular threshold distance value.

The channel manager 1118 can be configured to generate a communication channel associated with a space, equipment, control function, and/or the like, and manage registration of agents to the communication channel. In this regard, when an agent is registered to a communication channel, the agent may receive and/or publish messages over the communication channel as described herein. For example, an agent associated with a computing device may be registered to a communication channel associated with a physical location zone when the geolocation overlaps with a portion of the physical location zone. In another example, the channel manager 1118 can be configured to create a communication channel associated with a physical location zone in response to an occupancy level, as described herein.

In some embodiments, the channel manager 1118 can be configured to register an agent associated with a BMS device during commissioning of the BMS device. For example, if a new BMS device is added and mapped to a building space (e.g., a zone, room, or floor in a building), channel manager 1118 can be configured to automatically register the agent associated with the BMS device to a corresponding communication channel for the space. In this regard, the zone manager 1116 can be configured to map the BMS device to a particular space of the building, e.g., a physical location zone and/or a building control zone.

In some embodiments, the channel manager 1118 can be configured to create and/or manage a communication channel based on attributes associated with one or more agents. In an example implementation, employees of a business can each be associated with a computing device, whereby an agent associated with the computing device includes one or more attribute values indicating a job title, experience level, health information, etc. The channel manager 1118 may be configured to create and/or manage a communication channel, for example to ensure the safety of the employees, mitigate business risks, and the like.

In some implementations, the channel manager 1118 is configured to perform security related tasks for a communication channel. In some embodiments, the channel manager 1118 can be configured to perform an authentication process prior to or during registration of an agent to a communication channel. Any suitable authentication process may be used, including password, tokenization, biometric, and/or multi-factor systems. In some embodiments, the authentication process may vary depending upon a level of access or risk associated with registration of an agent to a communication channel.

In some embodiments, the channel manager 1118 is configured to perform an authorization process to determine whether a particular agent has subscription access and/or a level of subscription access. For example, an agent associated with a temperature sensor may not be authorized to subscribe to messages from the communication channel, even though the agent associated with the temperature sensor is authorized to publish messages on the communication channel (e.g., relating to temperature measurements). In contrast, an agent associated with a thermostat may be authorized to publish messages as well as to subscribe to messages on the communication channel, for example to receive messages with information relating to a control setpoint. In either example, authorization may or may not be limited, e.g., to all messages of the channel, to building control messages of the channel, to temperature-related messages of the channel, and/or the like.

As another example implementation, an agent associated with a computing device of an independent contractor may have only limited subscription access to messages published over a channel (e.g., to receive security alerts). In contrast, an agent associated with a computing device of a system level administrator or top-level executive may be authorized to receive all messages published over a channel.

In some embodiments, the channel manager 1118 is configured to perform an authorization process to determine whether a particular agent has publication access and/or a level of publication access. Publication access may be selectively configured based on the type of device, for example to limit the number of messages published over a channel and the corresponding data on the channel. For example, an agent associated with a building device may not have publication authorization or limited publication authorization based on a particular control circuit and inputs therein.

In some embodiments, the channel manager 1118 is configured to store authentication and/or authorization information as one or more attributes of an agent. In some embodiments, the channel manager 1118 may be configured to interact with other devices or systems described herein to facilitate authentication and/or authorization. In some embodiments, authentication and/or authorization processes are handled by other devices or systems described herein, and not by the channel manager 1118. For example, in some embodiments, authentication and/or authorization processes may be handled by one or more agents.

In some embodiments, the channel manager 1118 is configured to store published messages of a communication channel in the message log database 1112. In some embodiments, an agent can be configured to retrieve stored messages. For example, in some embodiments an agent may be configured with an attribute relating to whether the agent has an "active" status, e.g., whether the agent is actively receiving and/or publishing messages to the channel. For example, an agent with subscription to a communication channel may be "inactive," such that the agent does not actively receive published messages. In this regard, the agent can subsequently retrieve unreceived messages from a database, as described herein.

In some embodiments, message passing may be implemented via a Redis Pub/Sub system. In Redis Pub/Sub semantics, an agent or function may publish messages on any authorized channel arbitrarily simply by calling the PUBLISH command and specifying the name of the channel. Furthermore, abstraction provides agents with no (direct) control over which channels they communicate on. However, exceptions can be configured using a link property of an agent's configuration. In general, all messages and agent outputs are published on all the channels on which the agent is authorized to publish to, according to the semantics described above. A similar process may be used to decide which messages an agent should receive.

Figure 12A:
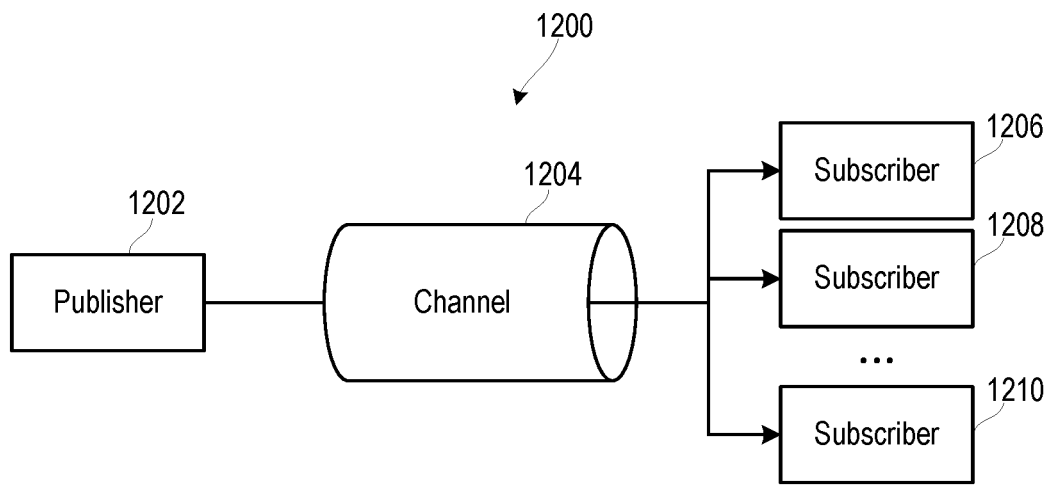
FIGS. 12A and 12B are various flow charts illustrating a number of publish-subscribe messaging patterns, according to some embodiments.
Figure 12B:
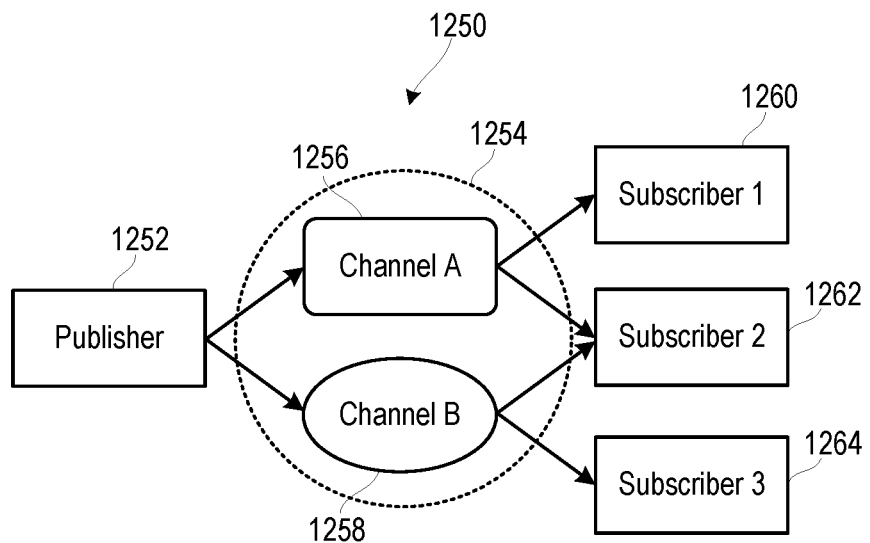

For example, referring to FIGS. 12A and 12B, various flow charts illustrating a number of publish-subscribe messaging patterns are shown, according to some embodiments. In FIG. 12A, a first messaging pattern 1200 illustrates a stand messaging scheme. A publisher 1202 publishes a message onto a channel 1204, which is then transmitted to subscribers 1206, 1208, and 1210 that are subscribed to the channel 1204, as discussed above. In FIG. 12B, a second messaging pattern 1250 illustrates a publisher 1252 publishing a message, which is then received by a communication infrastructure system 1254. The communication infrastructure system 1254 may be configured to parse the message for a specific aspect, such as a topic, an associated space, associated equipment, etc. The communication infrastructure system 1254 can then determine which channel 1254 and/or 1258 the message should be transmitted to, and provides the message to subscribers of that channel. In other embodiments, the publisher 1252 can publish messages to each of the channels 1256 and 1258, which is then transmitted to subscribers 1260, 1262, and 1264 that are subscribed to the channels 1256 and 1258. As shown in FIG. 12B, subscriber 1 1260 is only subscribed to channel A 1256, subscriber 2 1262 is subscribed to both channels A and B 1256 and 1258, and subscriber 3 1264 is only subscribed to channel B 1258. Example communication infrastructures may utilize decoupling and asynchronous delivery, as well as multiway delivery. This can allow for high throughput within the communication infrastructure. By using a message and channel based communication infrastructure, a scalable, persistent and anonymous communication scheme may be created.

Referring again to FIG. 11, in some embodiments, channel manager 1118 is configured to generate special channels. Special channels are treated differently from other channels (e.g., standard channels). In some embodiments, special channels may include command channels, agents state channels, metadata channels, waypoint channels, and or the like, which may be identified by a universally unique identifier (UUID) (e.g., randomly generated) at runtime. In some embodiments, the waypoint channel is used to process messages sent into the system from other systems or tools. In some embodiments, the command channel may be used to pass processed external instructions inside the building simulation. In some embodiments, the agent state channels and the metadata channels are used to publish information about the simulation to external systems or tools.

For example, the waypoint channel may be configured such that messages published to the waypoint channel may be arbitrary JSON, and are handled by the JSON to Haystack Bridge Agent. In order to maintain compatibility with the Haystack oriented internal semantics of the simulation's messaging infrastructure, the agent receives external commands, and converts them to a haystack compatible grid structure where the values of the grid rows are JSON encoded messages. The converted messages may then be sent out on the command channel.

The command channel may be subscribed to by all agents that process or executes the commands, and is intended to facilitate passing command and control instructions to a running simulation without getting "external" commands mixed up in other channels, or requiring knowledge of the network topology of a given simulation. From the agent's perspective (since agents are not aware of the channel a given message was received), command messages are identified by having "outside command" in the action column of the message's haystack grid, and have a JSON encoded payload in the actionVal column. The individual agents may then define their behavior with respect to these external messages, which could be set up to mirror internal messaging behavior, add in parameterized tweaks, and/or the like.

The metadata channel is used to publish simulation configurations and metadata to any external tools, such as a Web UI. In one embodiment, three metadata messages are sent per simulation run, but the present disclosure is not limited thereto, and in other embodiments more or less than three messages may be sent at a time. For example, in some embodiments, the three messages include a hierarchical structure of agents and zones which are used by the external tools to build a space navigation element, the UUID of a corresponding waypoint channel, and channel information that each agent publishes on to be used by the external tool to display state changes of a given space. The agent state channel is used to publish public portions of an agent's state. By default, the agent state includes any setpoints, outputs, or sensor data, but can be configured to output arbitrary parts of the agent's state by overriding a public state function on an agent. In some embodiments, agents may only publish messages within the system when a value changes. In other embodiments, the agents may publish data once per clock cycle for every agent on the Agent state channel to provide a real-time view of the agent state.

Still referring to FIG. 11, the user device 1134 may be any device capable of communicating to the controller 1102, as well as providing a device for a user 1138 to interface with the system 1100. In some embodiments, the user device 1134 may include personal computing devices such as smart phones (iPhone, Android phone, Windows phone), tablet computers (iPad, Android Tablet, Windows Surface, etc.), laptop computers, and/or desktop computers. The user device 1434 may further include a stand-alone device such as an Amazon Echo, or even a non-mobile device such as a voice capable thermostat, or other dedicated user device.

The BMS controller 1126 may be any BMS controller as described herein. In some embodiments, the BMS controller 1126 may be a dedicated BMS interface device, such as an Athens Smart Hub device from Johnson Controls. In some embodiments, the controller 1102 is configured to communicate with the intermediate devices 1146 via the BMS controller 1126. Each of the intermediate devices 1146 and the local devices 1148 may be any BMS or HVAC device as described herein. In some embodiments, the intermediate devices 1146 may include device controllers, sub-system controllers, RTU's, AHU's, etc. In some embodiments, the local devices 1148 may include thermostats, valves, switches, actuators, etc. As shown in FIG. 11, in some embodiments, there is no direct connection between the agent manager 1114 and the local devices 1148. In this case, the processing circuit 1104 may transmit the agent generation parameters to the local device 1148 via the BMS controller 1126 and one or more of the intermediate devices 1146.

In some embodiments, the agent generation parameters may include instructions to the BMS controller 1126 and the intermediate device 1146 to pass the agent generation parameters to the local device 1148 for installation. In still further embodiments, the agent generation parameters may be a fully functional agent, which, upon being received by the BMS controller 1126, can further propagate itself to the local device 1148 via the intermediate device 1146. For example, agent generation parameters may include system data, which allows the agent to map a path to the required local device 1148. Once the agent generation parameters have been received at local device 1148, an agent can install itself onto local device 1148. In some embodiments, the agent parameters are installed on a memory of the local device 1148, and an executable program file is executed using a processing device of the local device, thereby generating the agent within the local device 1148.

The security system 1152 may include multiple elements associated with a facility or building security system. For example, the security system 1152 can include multiple devices such as occupancy sensors or systems, cameras, microphones, motion detectors, thermal sensors, access devices (RFID locks, biometric locks, etc.), entry logs, etc. In one embodiment, the security system 1152 provides data to the controller 1102. The data may include occupancy data provided by the motion detectors and/or thermal sensors. Further, the data may include video and/or digital images provided by the cameras. In one embodiment, the digital images may be provided to the cloud-based service 1120 for processing via the controller 1102. For example, the cloud-based service 1120 may be a gesture recognition application, such as Microsoft Kinect.

Figure 13:
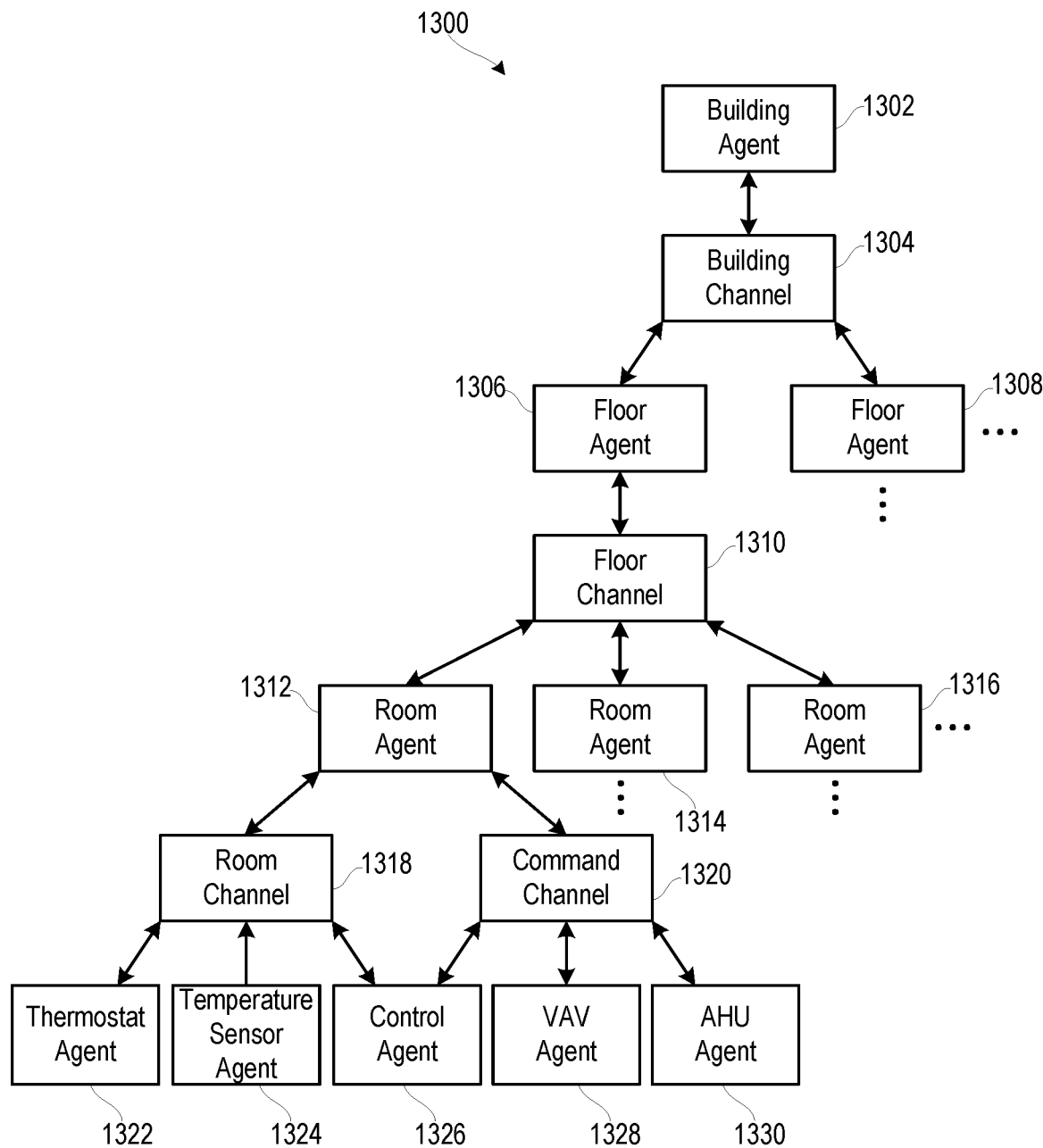
FIG. 13 is an example channel hierarchal structure, according to an exemplary embodiment.

Referring now to FIG. 13, an example channel hierarchal structure is shown, according to one exemplary embodiment. In some embodiments, space agents may be generated to represent every space in a building. For example, as shown in FIG. 13, a building agent 1302 may represent the entire building, floor agents 1306, 1308, etc., may represent each respective floor in the building, and room agents 1312, 1314, 1316, etc., may represent each room on each respective floor in the building. In some embodiments, the building agent 1302 may monitor, manage, or control each of the agents that serves the building, the floor agents 1306, 1308, etc., may monitor, manage, or control each of the agents that serves a corresponding floor, and the room agents 1312, 1314, 1316, etc., may monitor, manage, or control each of the agents that serves a corresponding room. Thus, in some embodiments, each of the space agents may have one or more associated communication channels, so that each of the space agents can communicate with other agents via their respective communication channels.

For example, a building channel 1304 may be generated for the building agent 1302, a floor channel 1310, etc., may be generated for each of the floor agents 1306, 1308, etc., and a room channel 1318, etc., may be generated for each of the room agents 1312, 1314, 1316, etc. In some embodiments, the building agent 1302 may communicate with each of the floor agents 1306, 1308, etc., via the building channel 1304, and each of the floor agents 1306, 1308, etc., may communicate with each of the room agents 1312, 1314, 1316, etc., on their respective floors via their respective floor channels 1310, etc. Thus, in this example, the building agent 1302 and each of the floor agents 1306, 1308, etc., may be registered on the building channel 1304 to publish and/or subscribe to messages received on the building channel 1304, and each of the floor agents 1306, 1308, etc., and their respective room agents 1312, 1314, 1316, etc., may be registered on their respective floor channels 1310, etc., to publish and/or subscribe to messages received on their respective floor channels 1310, etc.

Similarly, in some embodiments, each of the room agents 1312, 1314, 1316, etc., may communicate with other agents (e.g., thermostat agent 1322, temperature sensor agent 1324, control agent 1326, and/or the like) that serve their corresponding room via a corresponding room channel 1318, etc. Thus, in this example, each of the room agents 1312, 1314, 1316, etc., and their respective other agents (e.g., thermostat agent 1322, temperature sensor agent 1324, control agent 1326, and/or the like) that serve their corresponding room may be registered on their respective room channels 1318, etc., to publish and/or subscribe to messages received on their respective room channels 1318, etc. Thus, in this example, messages that are published from parent agents can be transmitted downstream to child agents, and messages that are published from the child agents can be transmitted upstream to the parent agents as needed or desired.

For example, if the building is in an emergency state, the building agent 1302 can publish an emergency message on the building channel 1304, each of the floor agents 1306, 1308, etc., can receive the emergency message on the building channel 1304 and republish the emergency message on their respective floor channels 1310, etc., each of the room agents 1312, 1314, 1316, etc., can receive the emergency message on their respective floor channels 1310, etc., and republish the emergency message on their respective room channels (and/or other channels) 1318, etc., and each of the agents that serve their respective rooms can receive the emergency message on their respective room channels (and/or other channels) 1318, etc. Then, each of the agents can implement emergency procedures and transmit messages that the emergency procedures have been implemented upstream via their respective channels in a similar manner, so that the building agent 1302 can receive the messages via the building channel 1304. However, the present disclosure is not limited thereto, and in other embodiments, each of the child agents may also be registered to publish and/or subscribe to messages on each of their respective parent agents, grandparent agents, etc., so that messages published on the higher channels can be received concurrently (or simultaneously) by each of the child agents, grandchild agents, etc.

In some embodiments, other channels may also be generated for each of the space agents (or other agents) as needed or desired. For example, as shown in FIG. 13, the room agent 1312 also has a corresponding command channel 1320 to control the control agent 1326, VAV agent 1328, and AHU agent 1330 via the command channel 1320. In this case, when the room agent publishes a message, each of the room channel 1318 and the command channel 1320 receives the message to monitor, manage, or control the other agents that are subscribed to those channels. However, the present disclosure is not limited thereto, and it should be appreciated that any number of channels and type of channels as discussed above may be generated for the space agents and/or other agents as desired or required. For example, in other embodiments, the building agent 1302 and/or the floor agents 1306, 1308, etc., may also have a corresponding command channel to monitor and/or control various equipment or devices that serve the entire building (e.g., elevators, building access control devices, and/or the like) or floor.

Figure 14:
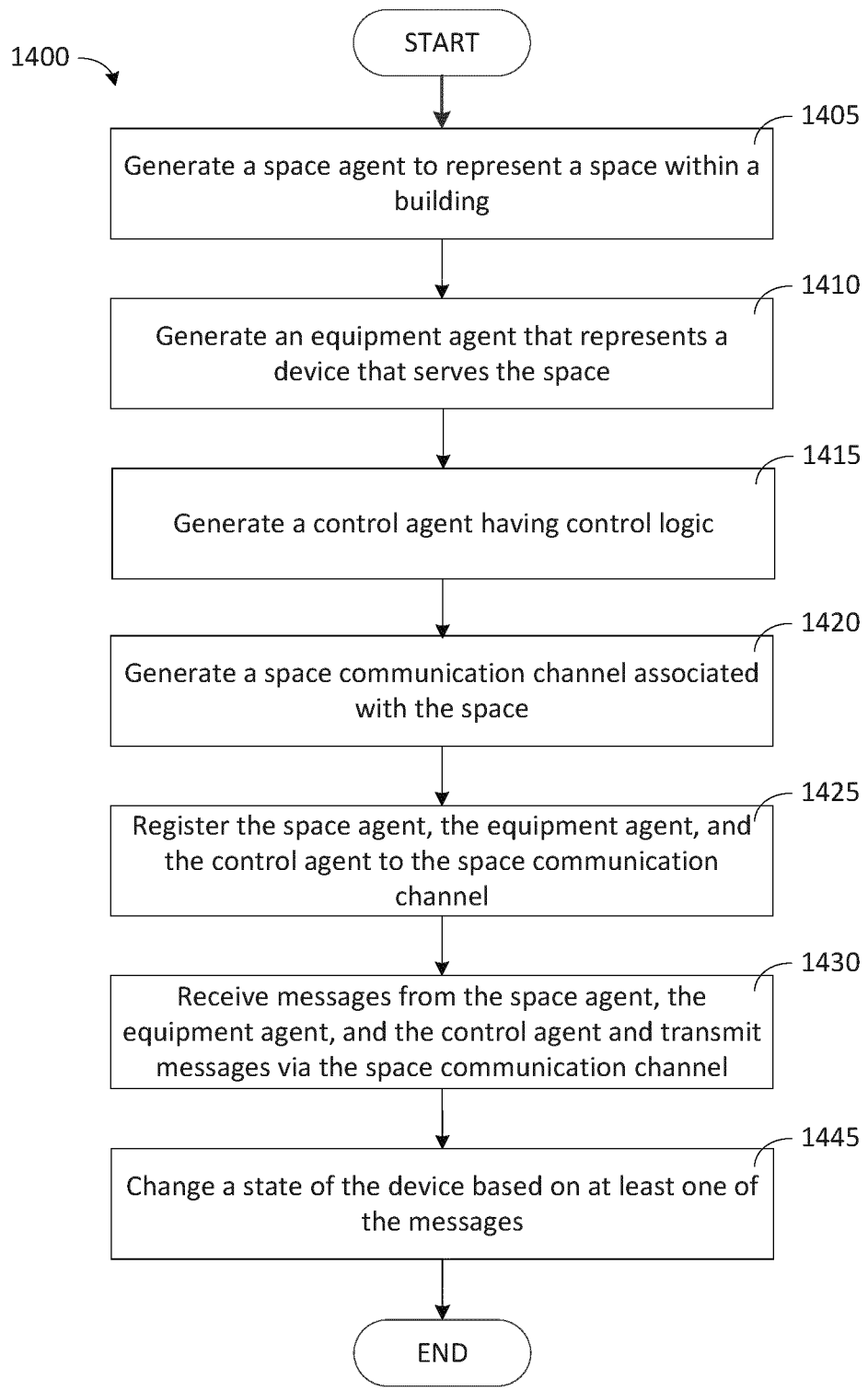
FIG. 14 is a flow diagram illustration a process for a building management system simulation, according to an exemplary embodiment.

Referring now to FIG. 14, a flow diagram illustration a process for a building management system simulation is shown, according to an exemplary embodiment. Referring to FIG. 14, the process 1400 starts and a space agent is generated by the agent manager 514 at block 1405 to represent a space within a building. In some embodiments, the space may be the building, floor, room, zone, and/or the like. In some embodiments, the space agent is configured to maintain an environmental condition (e.g., temperature setpoint, schedule, occupancy status, and/or the like) of the space based on an optimization state (e.g., optimized for costs, optimized for comfort, and/or the like) of the space.

In some embodiments, an equipment agent is generated by the agent manager 514 at block 1410 to represent a device that serves the space. In some embodiments, the device may be, for example, a BMS device, such as a thermostat, temperature sensor, AHU, VAV, and/or the like. In other embodiments, the device may be any suitable device, such as an audio visual device, blinds or shades, digital clock, and/or the like. In some embodiments, the equipment agent controls and/or monitors the device, such that the equipment agent has the same input/output functions of the device. In some embodiments, the device is located within the space, whereas in other embodiments, the device is located outside the space but configured to serve the space.

In some embodiments, a control agent is generated by the agent manager 514 at block 1415. In some embodiments, the control agent has control functions that override or optimize various control functions. In some embodiments, the control agent may be, for example, a global data sharing agent, a temporary occupancy override agent, a scheduled exception agent, a flow setpoint reset agent, an optimal start/stop agent, a reheat valve control agent, an unoccupied mode night setback agent, a chiller sequencing agent, and/or the like. In some embodiments, the control functions (or control logic) may correspond to the optimization state of the space. In some embodiments, the control functions override the optimization state of the space. For example, if the optimization state of the space is to conserve energy at a certain time of day, the control function may override the optimization state for occupant comfort during the certain time of day when the space is still occupied.

In some embodiments, a space communication channel associated with the space may be generated by the channel manager 1118 at block 1420. In some embodiments, each of the space agent, equipment agent, and control agent may be registered on the space communication channel at block 1425. In some embodiments, each of the space agent, equipment agent, and control agent may be configured to publish and/or subscribe to messages received on the space communication channel. In some embodiments, published messages may received from the space agent, the equipment agent, and/or the control agent and transmitted to at least one of the space agent, the equipment agent, or the control agent via the space communication channel at block 1430. In some embodiments, a state of the device may be changed based on at least one of the messages at block 1445. For example, if the device is a VAV and the message relates to a changed temperature setpoint, the VAV may open a damper to change its state based on the temperature setpoint.

In some embodiments, the space may be a room within a building, and a floor agent may be generated by the agent manager 514 to represent a floor within the building on which the room is located. In some embodiments, the agent manager 514 may generate a building agent to represent the building. In some embodiments, the channel manager 1118 may generate a floor communication channel associated with the floor and a building communication channel associated with the building. In some embodiments, the building agent and the floor agent may be registered on the building communication channel to exchange messages. In some embodiments, the floor agent and the room agent may be registered on the room communication channel to exchange messages. In some embodiments, the building agent may override controls of the other agents (e.g., floor agent, room agent, equipment agent, and/or control agent) by publishing messages over the building communication channel, and the floor agent may override controls of the other agents by publishing messages on the floor communication channel.

Channel Configuration Examples

In some embodiments, internal messages (e.g. messages within the simulation) are formatted using a Haystack JSON encoding standard. A number of helper functions may be available for formatting simple message packets in a Haystack compatible manner and/or parse and extract specific portions of certain messages. Further, messages from an agent to a web-based user interface, and vice versa, may be serialized as JSON. In some embodiments, messages may be dispatched synchronously or asynchronously. In a synchronous system, the messages are transmitted to a channel, dispatched to agents which subscribe to the channel, and any responses are republished if they are provided. In an asynchronous system, the messages may be injected into the system by publishing properly formatted messages to the correct Redis channel. By performing this process asynchronously, the architecture can be leveraged to demonstrate concurrent/parallel interactions using add-ons or other extensions to a given configuration.

The decentralized message passing architectures described herein have various differences from existing HVAC architectures. For example, the decentralized message passing architecture may utilize a shared nothing architecture, meaning that each agent is independent and self-sufficient with absolutely no shared state. In this case, the only way for agents to know about each other in a shared nothing architecture is through messages. For example, assuming there is an optimization on an AHU fan speed, which requires VAV and thermostat information to compute, the following channel configuration may be used:

EQUIPMENT Channel
   Publishers:
      VAV1, VAV2, . . . , VAVn, thermostat1, thermostat2, . . . , thermostatN
   Subscribers
      AHU1

This is needed in order for the AHU to receive the information from the thermostats and VAVs necessary to compute the optimum fan speed. To move the above optimization logic into its own separate agent (Opt1), then the channel may be configured as follows:

EQUIPMENT Channel
   Publishers
      Opt1, VAV1, VAV2, . . . , VAVn, thermostat1, thermostat2, . . . thermostat
   Subscribers
      Opt1, AHU1

The above reconfiguration of the Equipment channel moves all the optimization logic to Opt1, which can then send a fan speed command to AHU1.

In some embodiments, the above architecture may further improve change propagation. For example, due to the decentralized nature of the messaging infrastructure, there can be significant lag time between when a sensor change is first noticed, and when a corrective action happens. Change and corrective actions are reported via messages instead of a centralized state so the number of hops a message has to travel can become a limiting factor. As an example, a thermostat may register a temperature increase that should lead to a VAV sending more cooling air and the AHU increasing its fan speed. The propagation of the change may progress as follows:

Thermostat sensor records temperature change
   Thermostat sends temperature change message
   VAV receives temperature change message
   VAV changes it's damper offset
   VAV sends damper offset change message
   AHU receives damper offset change message
   AHU changes it's fan speed The above message chain delays the AHU from changing its fan speed by at least the time of two message cycles. Thus, longer chains of changes and corrective actions will have corresponding longer delays. In some embodiments, to reduce lag time, a command channel can be configured so that a control agent (Ctrl) can send a message to the AHU to change it's fan speed while the VAV is changing it's damper offset. In this case, the following channel configuration may be used:

CONTROL Channel:
   Publishers
      Ctrl1, Thermostat
   Subscribers
      Ctrl1, VAV, AHU In this example, the propagation of change may progress as follows:

Thermostat sensor records temperature change
   Thermostat sends temperature change message
   Ctrl1 and VAV receives temperature change message
   Ctrl1 sends a damper offset change message while VAV changes it's damper offset
   AHU receives damper offset change message
   AHU changes it's fan speed Agents in the above architectures may also frequently have partial or stale information with which to make decisions as a consequence of communicating through asynchronous messages. For example, a VAV agent (VAV1), may have a behavior that is dependent on thermostats A, B, and C. The thermostat messages can arrive in thirteen different ways, as shown here: ({ABC}), ({A}-{BC}), ({A}-{B}-{C}), ({AB}-{C}), ({A}-{C}-{B}), ({AC}-{B}), ({B}-{AC}), ({B}-{A}-{C}), ({B}-{C}-{A}), ({BC}-{A}), ({C}-{A}-{B}), ({C}-{AB}), ({C}-{B}-{A}). Only ({ABC}) will give VAV1 a complete up to date view of the thermostat's sensor information. All other permutations of message arrivals will have VAV1 working with incomplete information. In some embodiments, VAV1 can store previous thermostat sensor readings until it has the up to date view needed to perform its function.

As discussed above, agents can be used to simulate a BMS. The agents may be used to represent any aspect of a simulation. The agents can be used either at a very specific individual level (e.g., a temperature sensor), or a more complex aggregated level (e.g., an agent that monitors and coordinates temperature setpoints for a building). In some embodiments, agents only have access to their own internal state, and the content of any messages published on channels to which they are subscribed. Therefore, an agent can be abstractly described as simply a function from an initial/internal state and (optionally) a set of input messages, to a different internal state and (optionally) a set of output messages. These properties and behaviors are implemented by defining a plurality of behavioral functions and a display function.

For example, in some embodiments, specific agent behavior is defined by implementing one or more of the following functions, and optionally a function defining which portions of their internal state are published to various display tools. However, not all functions must be defined to specify a valid agent, and any functions not defined in a given implementation will be no-ops (e.g., no operation). In some embodiments, an agent (such as one of the various types of agents described above) may further be passed into a channel via a parameter for each function, such as behavior functions.

According to an example embodiment, an example message format may be represented by the following:

```
{'<group name (i.e., output, sensor_data, display)>' : {
  '<reading name> ' : {
    'value' : '<reading value (often a floating point but not always)>',
    'units' : '<reading unit>',
    'title' : '<reading display>'
  }
}
```

A list of agents and the last time that they have sent a message may be represented by the following heartbeatMap:
   {'id': '<agent id>', 'curVal': '<last timestamp of a heartbeat message>'}

A reading type may be represented by the following metadata of readingType:

{'readingType': '<type of reading (e.g., temperature, psi, air flow)>'}
where a reading message type is used to communicate an agent's output or sensors to other agents on the channel by the following:

```
{'id' : '<agent id>' ,
 'dis' : '<description of reading>' ,
 'curval' : '<a HayStack quantity (e.g., a data structure with a value and units)>'}
```

A sample action message used to give commands to agents on a channel (e.g., change a VAV's setpoint) may be represented by the following:

```
{'id' : '<agent id>' ,
 'action' : '<action to be performed>' ,
 'actionVal' : '<information necessary to perform the action (e.g., new setpoint)>' }
```

In some embodiments, a behavior function may be a "per tick update" function. The per tick update function is run once per "tick" for every agent. The per tick update function is configured to return a list of 0 to N messages (where N is a natural number) which will be published to the agents channels. A tick may be a number on the sequence (0 . . . N) representing a step of time (e.g. five seconds, one minute, or the like). Generally, a tick has no relation to physical time.

In some embodiments, another behavior function is a message handling function. The message handling function is called for every message received by an agent. The message handling function return value may be generally expected to be a (possibly empty) array of messages to be published as based on the input message. In some embodiments, another behavior function is a sensor read function. The sensor read function is provided as a semantically distinct place to implement behavior which simulates sensor reading for a given agent, or to make a call to actual sensor hardware and integrate the result. The sensor read function can be configured to modify the internal state of an agent. However, in some embodiments, the return value of the sensor read function may not be used to trigger any sort of message publication, so any sensor changes that are to result in messages being published to the rest of the system should have a matching implementation in the agents tick update function, which may be configured to return a new published message conditioned on changes in an agent's internal state.

In some embodiments, another behavior function is a public state function. The public state function may be called once per tick, and may be used to return an internal agent state to be published on a channel, such as the Agent State channel. The internal agent state may then be displayed via a UI (e.g., WEB UI). For example, a return value of the public state function may be represented by the following:

```
{'agent' : '<agent id>'
 'state' : '<publicly publishable state>'}
```

Accordingly, in some embodiments, for each step through the call cycle, an agent's processes may run in the order of: tick update==>read_sensors==>behavior==>public state. A simulation, such as that described above, may run for a number of ticks specified by the initial runner script. For every tick, the following actions may be performed for every agent.

1. Update_tick—once per tick update function.
2. Update_sensor_data—a hook for agents to simulate sensor data and update their internal state.
3. Function_name_here—called for every message received by the agent. Can optionally return a response/result message to be published.

While some of the above non-limiting examples are described with reference to controlling and/or monitoring temperature, the present disclosure is not limited thereto, and it should be appreciated that various embodiments of the present disclosure may be applied to simulate, control, and/or monitor any suitable environmental conditions, equipment, or devices of a building, such as humidity, particulate count, occupancy time (actual and/or expected), lighting, audio/visual, fire safety, electrical, security, access control, lifts/escalators, and/or the like, for example.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for simulating a building management system, the method comprising:
generating, by one or more processors, a space agent representing a space in a building, the space agent configured to maintain an environmental condition of the space based on an optimization state of the space;
generating, by the one or more processors, an equipment agent representing a device that serves the space; and
registering, by the one or more processors, the space agent and the equipment agent to a space communication channel associated with the space,
wherein the space agent is configured to communicate with the equipment agent over the space communication channel.

2. The method of claim 1, wherein the environmental condition corresponds to a temperature setpoint.

3. The method of claim 2, wherein the space agent is configured to set the temperature setpoint based on the optimization state.

4. The method of claim 1, wherein the method further comprises:
generating, by the one or more processors a control agent having control logic to control the environmental condition of the space; and
registering, by the one or more processors, the control agent to the space communication channel associated with the space,
wherein the control agent is configured to communicate with the space agent over the space communication channel to provide the control logic to the space agent.

5. The method of claim 4, wherein the space agent is configured to communicate with the equipment agent and the control agent by publishing messages to the space communication channel and receiving messages published by the equipment agent and the control agent from the space communication channel.

6. The method of claim 5, wherein the control logic corresponds to the optimization state.

7. The method of claim 5, wherein the control logic overrides the optimization state.

8. The method of claim 1, wherein the space is a room within the building, and wherein the method further comprises:
generating, by the one or more processors, a floor agent representing a floor within the building on which the room is located; and
registering, by the one or more processors, the floor agent and the space agent to a floor communication channel associated with the floor,
wherein the floor agent is configured to communicate with the space agent over the floor communication channel.

9. The method of claim 8, further comprising:
generating, by the one or more processors, a building agent representing the building; and
registering, by the one or more processors, the building agent and the floor agent to a building communication channel associated with the building,
wherein the building agent is configured to communicate with the floor agent over the building communication channel.

10. The method of claim 9, wherein the building agent is configured to override controls of each of the other agents by publishing messages on the building communication channel, and the floor agent is configured to override controls of the space agent by publishing messages on the floor communication channel.

11. A system for a building management system (BMS) simulation, the system comprising:
one or more processors; and
memory coupled to the one or more processors and having instructions stored thereon that when executed by the one or more processors, cause the one or more processors to:
generate a space agent representing a space in a building, the space agent configured to maintain an environmental condition of the space based on an optimization state of the space;
generate an equipment agent representing a device that serves the space; and
register the space agent and the equipment agent to a space communication channel associated with the space,
wherein the space agent is configured to communicate with the equipment agent over the space communication channel.

12. The system of claim 11, wherein the environmental condition corresponds to a temperature setpoint.

13. The system of claim 12, wherein the space agent is configured to set the temperature setpoint based on the optimization state.

14. The system of claim 11, wherein the instructions further cause the one or more processors to:
generate a control agent having control logic to control the environmental condition of the space; and
register the control agent to the space communication channel associated with the space,
wherein the control agent is configured to communicate with the space agent over the space communication channel to provide the control logic to the space agent.

15. The system of claim 14, wherein the space agent is configured to communicate with the equipment agent and the control agent by publishing messages to the space communication channel and receiving messages published by the equipment agent and the control agent from the space communication channel.

16. The system of claim 15, wherein the control logic corresponds to the optimization state.

17. The system of claim 15, wherein the control logic overrides the optimization state.

18. The system of claim 11, wherein the space is a room within the building, and wherein the instructions further cause the one or more processors to:
generate a floor agent representing a floor within the building on which the room is located; and
register the floor agent and the space agent to a floor communication channel associated with the floor,
wherein the floor agent is configured to communicate with the space agent over the floor communication channel.

19. The system of claim 18, wherein the instructions further cause the one or more processors to:
generate a building agent representing the building; and
register the building agent and the floor agent to a building communication channel associated with the building,
wherein the building agent is configured to communicate with the floor agent over the building communication channel.

20. The system of claim 19, wherein the building agent is configured to override controls of each of the other agents by publishing messages on the building communication channel, and the floor agent is configured to override controls of the space agent by publishing messages on the floor communication channel.

* * * * *